US011816025B2

(12) United States Patent
Hazel et al.

(10) Patent No.: US 11,816,025 B2
(45) Date of Patent: Nov. 14, 2023

(54) HARDWARE ACCELERATION

(71) Applicant: Myrtle Software Limited, Cambridge (GB)

(72) Inventors: Graham Hazel, Cambridge (GB); Oliver Bunting, Cambridge (GB); Douglas Reid, Cambridge (GB); Elizabeth Corrigan, Cambridge (GB)

(73) Assignee: Myrtle Software Limited, Cambridge (GB)

( * ) Notice: Subject to any disclaimer, the term of this patent is extended or adjusted under 35 U.S.C. 154(b) by 0 days.

(21) Appl. No.: 17/765,973

(22) PCT Filed: Oct. 5, 2020

(86) PCT No.: PCT/GB2020/052455
§ 371 (c)(1),
(2) Date: Apr. 1, 2022

(87) PCT Pub. No.: WO2021/064433
PCT Pub. Date: Apr. 8, 2021

(65) Prior Publication Data
US 2022/0374348 A1 Nov. 24, 2022

(30) Foreign Application Priority Data
Oct. 4, 2019 (GB) .................................... 1914353

(51) Int. Cl.
*G06F 12/02* (2006.01)
*G06F 12/06* (2006.01)
(52) U.S. Cl.
CPC ...... *G06F 12/0207* (2013.01); *G06F 12/0607* (2013.01)
(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 5,359,724 A * 10/1994 Earle ...................... G06F 40/18
 711/E12.003
5,878,424 A * 3/1999 Dooling .............. G06F 12/0207
 708/607
(Continued)

FOREIGN PATENT DOCUMENTS

EP 3343390 A1 7/2018
EP 3343391 A1 7/2018
EP 3396533 A2 10/2018

OTHER PUBLICATIONS

J. Nunez-Yanez, "Fused Architecture for Dense and Sparse Matrix Processing in TensorFlow Lite," in IEEE Micro, vol. 42, No. 6, pp. 55-66, Nov. 1-Dec. 2022, doi: 10.1109/MM.2022.3196705. (Year: 2022).*
(Continued)

*Primary Examiner* — Daniel C. Chappell
(74) *Attorney, Agent, or Firm* — Stanek Lemon Crouse & Meeks, PA

(57) ABSTRACT

A hardware accelerator may be used for assisting a separate processor in performing sparse embedding vector lookup operations, each non-zero index of a sparse embedding vector referencing a respective dense embedding vector. The hardware accelerator comprises: a plurality of Dynamic Random Access Memory (DRAM) modules, each DRAM module comprising a distinct packaged device or chiplet; one or more memory controllers, each memory controller being configured to address a subset of the plurality of DRAM modules, each memory controller and associated subset of the DRAM modules defining a memory channel; and processing logic, arranged to control the one or more memory controllers. More than one dense embedding vector may be read from multiple memory channels in parallel and/or multiple copies of a dense embedding vector are stored in a memory channel.

20 Claims, 14 Drawing Sheets

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| 10,409,887 | B1* | 9/2019 | Gauria | G06F 12/0646 |
|---|---|---|---|---|
| 2014/0025908 | A1* | 1/2014 | Sharma | G06F 12/0607 |
| | | | | 711/157 |
| 2017/0371812 | A1* | 12/2017 | Chun | G06F 3/0659 |
| 2018/0189110 | A1* | 7/2018 | Venkatesh | G06F 9/5083 |
| 2019/0073590 | A1* | 3/2019 | Wu | G06T 1/20 |
| 2019/0361954 | A1* | 11/2019 | Page | G06F 3/0673 |
| 2021/0264220 | A1* | 8/2021 | Wei | G06N 20/10 |

OTHER PUBLICATIONS

Search Report, GB1914353.6, dated Feb. 13, 2020, 4 pages.
Yavits et al., "Sparse Matrix Multiplication on CAM Based Accelerator," Hardware Architecture arXiv, May 28, 2017, 5 pages.
International Search Report and Written Opinion, PCT/GB2020/052455, dated Feb. 2, 2021, 10 pages.

* cited by examiner

HARDWARE ACCELERATION

CROSS-REFERENCE TO RELATED APPLICATIONS

This application is a 35 U.S.C. § 371 National Stage Entry of International Application No. PCT/GB2020/052455 having an international filing date of Oct. 5, 2020, which claims the benefit of Great Britain Application No. 1914353.6, filed Oct. 4, 2019, the contents of which are hereby incorporated herein by reference in their entireties.

TECHNICAL FIELD OF THE DISCLOSURE

The disclosure concerns a hardware accelerator to assist a separate processor in performing sparse embedding vector lookup operations and a method for performing sparse embedding vector lookup operations using a hardware accelerator.

BACKGROUND TO THE DISCLOSURE

Machine learning (ML) workloads are being deployed with increasing scale and complexity. It is now commonplace that a ML model will be too large (in memory footprint or computational requirements, or both) to fit within a single computational device, and will instead be distributed across several different devices (or nodes), for example in a data centre.

Producing specialized computational devices (known as accelerators) for ML workloads is also common. The assumed scenario is often to deploy a fleet of (identical) accelerators up to the scale required to tackle a given problem. As such, accelerators have to be designed to "scale up", that is so that they can pass data between nodes efficiently, so the sum of the parts achieves as close as possible to theoretical peak performance. For instance, https://engineering.fb.com/data-center-engineering/accelerating-infrastructure/outlines how Facebook, Inc. use M.2 form-factor accelerator cards within infrastructure for video transcoding. Intel Corporation have launched an M.2 form-factor accelerator aimed specifically at ML inference within the data centre (https://newsroom.intel.com/wp-content/uploads/sites/11/2019/08/Intel-Nervana-NNP-I-HotChips-presentation.pdf).

Many current ML solutions are, from the point of view of deployment, computational networks (typically, types of neural network or more specifically, deep neural network, DNN). Such networks can have a very large number of parameters (hundreds of millions or more) and a fixed computational structure. Considered at a high-level, they have a memory bandwidth requirement (how much memory they have to read, that is the memory footprint of the parameters) and a compute requirement (how many operations such as multiplication and addition are required to complete the full solution). The ratio of bandwidth to compute (BCR) is therefore a relevant consideration in assessing computational devices for ML applications.

BCR can be affected by other considerations, principally the batch size (how many independent examples are computed in parallel at one time). Typically, the main bandwidth requirement is per batch, so larger batch sizes are more bandwidth-efficient. However if a batch gets too large, the latency or worst-case latency (longest time to complete the computation for a single solution) may become unacceptably large, placing limits on how far the ratio can be stretched.

The design of the network can also greatly influence the bandwidth requirement. For instance, convolutional neural networks (CNNs) reuse the same parameters many times, by passing a small "window" over a large data input. When the input data is a 2D image, small 2D filters with identical coefficients can be applied at many different locations over the 2D image, greatly reducing the number of unique parameters. This makes the BCR very low for this type of network. Other types of DNN may have much higher BCRs since they do not have equivalent symmetry properties to simplify the problem.

The present disclosure concerns a class of problems that are difficult to scale efficiently on a homogeneous fleet of accelerators, since they are naturally asymmetrical with different functions having very different functional requirements. For instance, the requirements for DNN activation computation are very different from other memory-limited operations that must also be performed. These memory-limited operations dominate the computation in some cases and, once DNN activation computation is successfully accelerated, models that are not currently memory-limited will become so.

DNN computation, particularly for RMs, uses sparse input vectors. Each sparse vector conceptually has very many entries (for example, millions), but only a very small fraction of them are non-zero. Recommendation models (RMs) are a practical example of a machine learning workload using such sparse input vectors. An example may include the open-source Deep Learning Recommendation Model (DLRM) repository provided by Facebook® (https://ai.facebook.com/blog/dlrm-an-advanced-open-source-deep-learning-recommendation-model/).

Referring to FIG. 1, there is schematically shown a conversion from sparse embedding vectors (a one-hot or multi-hot encoded sparse embedding vector representation) to a dense representation, as part of a sparse embedding vector sum operation (referred to as "SparseLengthSum"). This occurs in the first part of the computational network as follows: for each non-zero entry in the sparse vector, its position in the vector is taken as an index to look up in a large embedding table. The result of this look-up process is a small dense vector. Typically, these dense embedding vectors are then summed together to give the final dense representation. Sometimes, the dense embedding vectors are added as a weighted sum to give the final dense representation. This lookup of elements from an embedding table and subsequent summation is referred to herein as sparse embedding vector operations. For the DLRM example published by Facebook, Inc., the number of one-hot encoded sparse vector elements is variable, and could be any length, but it is anticipated to be on the order of tens to hundreds of values (typically dependent on the configuration of the system, for example number of variables in the vector and bit depth used to store the variables). The format of the dense embedding vectors V, stored with an embedding table, is typically 32 to 64 vector elements stored in fp16 (2 bytes) or fp32 (4 bytes) format, giving a typical size of between 64 to 256 bytes for each dense embedding vector. Depending on the model size, this embedding table look-up process may require large memory storage, as well as high (and unpredictably random) memory bandwidth, with a very high BCR. It has been found that sparse embedding vector lookup operations are typically slow and inefficient. A reason for this has been suggested as "co-location", meaning running more than one model for a single server CPU node. The resulting slowdown was found to be worse than linear.

Hwang et. al., "Centaur: A Chiplet-based, Hybrid Sparse-Dense Accelerator for Personalized Recommendations." *arXiv preprint arXiv:2005.05968* (2020) describes an approach in which a Field-Programmable Gate Array (FPGA) is embedded into a CPU socket, such that it has cache coherent access to CPU memory. This is used for improving the processing of sparse embedding layers. Bypassing the CPU cache is recommended for memory-intensive embedding layers.

EP3396533A2, EP3343390A1 and EP3343391A1 discuss heterogeneous hardware accelerator architectures for processing sparse matrix data having skewed non-zero distributions. These documents suggest that a memory interface should be optimised for high bandwidth. No details of any such optimisation are given and such optimisation may differ between reading sparse matrix data from a table and sparse vector data from a table.

Improving the performance of such sparse embedding vector lookup operations, particularly for reading and optionally, summing of sparsely-indexed, dense embedding vectors, is therefore highly desirable. In particular, this should advantageously be achieved in a way that avoids such a poor non-linear slowdown when running multiple models.

SUMMARY OF THE INVENTION

Against this background, there is provided a hardware accelerator for assisting a separate processor in performing sparse table lookup operations in accordance with claim 1, methods for performing sparse table lookup operations in line with claims 13 and 17 and a computer program as defined by claim 20. Further features of the invention are detailed in the dependent claims and discussed herein.

In one aspect, sparse embedding vector lookup operations can be improved by offloading the operation from a main processor (for example, a CPU) to one or more separate hardware accelerators, each having dedicated memory that is separate from the memory associated with the main processor (which may be cached). For example, the data for the sparse embedding vector lookup operation (comprising a plurality of dense embedding vectors) can be communicated to a hardware accelerator (where the term "communicate" is used herein, this may denote sending and/or receiving). The data for the sparse embedding vector lookup operation may be stored on the dedicated memory of the hardware accelerator. The sparse embedding vector lookup operation may then be performed at the hardware accelerator by reading at least some of the data for the sparse embedding vector lookup operation (that is, one or more of the dense embedded vectors) stored on the dedicated memory. Optionally, the dedicated memory of some or all of the one or more hardware accelerators is outside of or excluded from a main processor (CPU) cache infrastructure or other standard main processor hardware memory access architecture.

Offloading sparse embedding vector lookup operations (such as a sparse length sum operation) to one or more high memory-access speed hardware accelerators has been found to significantly improve the performance of ML processing. Unlike computational hardware accelerators, in which the processor is optimized for the operation, a hardware accelerator for sparse embedding vector lookup operations is configured (and preferably optimized) for high bandwidth random access memory access patterns for data that is typically short in length, for instance in the order of 32 to 256 bytes. As discussed further herein, such a hardware accelerator preferably uses more individually addressable memory modules (modules being addressed in groups of one, two, or four modules, for instance) that are more separately controlled. Multiple such hardware accelerators may be optimized for separate tasks, for example in terms of their memory architecture and/or access configuration.

The main processor and/or a separate load balancer advantageously identifies a sparse embedding vector lookup operation within instructions it is processing, which may allow the offloading of this operation to the hardware accelerator, rather than the operation being processed by the main processor. A result of the sparse embedding vector lookup operation may be communicated from the hardware accelerator to the main processor. This may be direct and/or through a load assembler.

In another aspect, a hardware accelerator for assisting with sparse embedding vector lookup operations may be based around individually accessible Dynamic Random Access Memory (DRAM) modules, particularly Synchronous DRAM (SDRAM) modules, including Double Data Rate (DDR) modules. Each memory module comprises or is a distinct packaged device, such as a chip or IC (in other words, each module being a single electronic component) or chiplet. A memory channel may be defined by a group of (comprising one or more) DRAM modules controlled by a dedicated logical or physical memory controller, in particular via a dedicated physical data bus and a dedicated physical or logical command and address bus. Each memory channel is controlled by processing logic (although processing logic may control multiple memory channels), in particular so as to read data from multiple memory channels (and/or different DRAM modules) in parallel. In other words, memory controllers may read data (or more than one dense embedding vector, which may be the different vectors or different copies of the same vector) from more than one individually-accessible memory channel (each comprising one or more DRAM modules) in parallel. Specifically, dense embedding vector elements from more than one sparse embedding vector lookup operation are advantageously read in parallel, or multiple dense embedding vector elements, from a single sparse vector lookup operation may be read in parallel, or multiple bytes of data from a dense embedding vector element may be read in parallel. Parallel in this context need not mean entirely simultaneously, but rather at least partially or substantially (for instance, at least 25%, 50% or 75%) overlapping in time. In other words, readout from a first memory channel may be still taking place when readout from a second memory channel (using a different logical or physical memory controller) has already started. The data width of the address line for each memory controller is potentially smaller than the word size of the main processor (for example, an 8-bit or 16-bit data width).

Within each memory channel, each memory controller may control only a small number (for instance, one or two) of the DRAM modules and preferably no more than 4 DRAM modules. In so-doing, the data width between each memory controller and one or more associated DRAM module is made narrow. This contrasts with conventional memory architectures, in which a single controller is provided for a wide channel of (for instance, all) memory modules in a memory system or a memory rank (for example, to provide a data width of a certain bit size, such as 64 bits or 72 bits, which may involve 8 or 9 DRAM modules, as is common on DIMM modules). The use of multiple memory controllers may improve random access speed to the memory and more specifically bandwidth, especially by allowing parallel access so as to enable more independent addresses to be accessed at any one time. A single dense embedding vector element that is used as part of a sparse vector lookup operation may thereby be read from a contiguous memory portion of a DRAM module in multiple read operations, using at least two read operations and optionally at least 3, 4, 5, 6, 7, 8, 9 or 10 read operations. Each memory controller may interface with a subset of the plurality of DRAM modules via a data bus of no more than 40 bits and preferably 32 bits, 16 bits or 8 bits. The one or more memory controllers may be provided as single device or a small number of devices, for instance each such device being formed as an Application Specific Integrated Circuit (ASIC), or as discrete, interconnected memory controller modules (in which case, the processing logic may be distributed between the memory controller modules), for example using ASICs or programmable logic, such as a Field-Programmable Gate Array (FPGA).

Each DRAM module typically has a respective plurality of memory addresses that are divided into rows and/or multiple banks (with multiple rows in each bank). Successive dense embedding vectors are beneficially read from different banks. Additionally or alternatively, multiple rows from different banks may be activated in parallel and data from each of the activated multiple rows may be read by interleaving data reads to different dense embedding vectors in different banks, or by interleaving data reads to different bytes of dense embedding vectors stored in different rows. Either or both of these approaches may further improve the read bandwidth, especially where there is a time constraint between activating and/or reading from memory on different rows in the same bank. This may also be useful where there is a time constraint on the number of row activations that can occur in a given time period. Narrow channels may also be helpful in mitigating issues with these time constraints.

Data interfaces may each provide a dedicated data path between a memory controller and an associated set of DRAM modules in a memory channel. Each memory controller may have multiple such data interfaces, one for each DRAM channel, but more commonly, a data bus links each memory controller with all its associated DRAM modules in the memory channel. However, this may be complemented by a shared address and command path between memory controllers in more than one associated memory channel (so-called "Ping Pong Phy" mode). The address and command interface may thereby be timeshared between the two or more memory channels. This may enable the design to use a single memory controller to control multiple memory channels, enabling less logic and chip pins to be used to implement memory controller logic.

In embodiments, an Input/Output (I/O) controller may receive processing data, including data for storage in the DRAM modules, for example data to store for a fraction of one embedding table, a whole embedding table or multiple embedding tables. It may also receive vector addresses or indices over which to sum dense embedding vector elements and coefficients, by which to perform weighted sum operations, the list of indices representing the non-zero elements of the sparse vectors. The processing logic may also perform a calculation (such as sum operation) on the dense embedding vectors read from the DRAM modules, which may then be output via the I/O controller. On a single hardware accelerator, a partial or complete sparse embedding vector lookup operation can be completed. In some instances, where an embedding table is very large and the data for the table is stored across multiple hardware accelerators, each hardware accelerator could perform a partial sparse embedding vector lookup operation, with the host CPU combining multiple partial results from multiple accelerators.

Beneficially, information representing dense embedding vectors is stored across the DRAM modules, with at least a portion of the information being read in parallel, which is then used in a sum operation. This process may be repeated, for example to complete the sparse embedding vector lookup operations. Pipelining may be employed to speed up repeated sequential reading and processing operations.

Such reading and processing may be implemented in a number of ways. A number of less preferred ways are firstly considered. For instance, a portion of a first dense embedding vector (or all of it) may be stored in a first DRAM module (or more specifically, a first memory channel) and a portion of a second dense embedding vector (or all of it) may be stored in a second DRAM module (more specifically, a second, different memory channel). Then, some or all of the first vector may be read out in parallel with some or all of the second vector. The sum operation may then be performed on the data read out in parallel.

In another approach (which is not mutually exclusive from the first approach), a first portion of a first vector may be stored in a first DRAM module (or more specifically, a first memory channel) and a second portion of the first vector may be stored in a second DRAM module (or more specifically, a second, different memory channel). The first and second portions may then be read out in parallel. Advantageously, a first portion of a second vector may also be stored in the first DRAM module (memory channel) and a second portion of the second vector may be stored in the second DRAM module (memory channel). The first and second portions of the second vector may also be read out in parallel (at a different time from reading out the first and second portions of the first vector). A first sum operation may be performed on the first portion of the first vector with the first portion of the second vector and a second sum operation may be performed on the second portion of the first vector with the second portion of the second vector. This is particularly useful when the first portions of the first and second vectors are the same size and/or the second portions of the first and second vectors are the same size.

Another implementation (again, not mutually exclusive) may store multiple dense embedding vectors in a first DRAM module (or more specifically, a first memory channel) and the same (or at least some of the same) vectors in a second DRAM module (or more specifically, a second, different memory channel). Then, a first portion of the dense embedding vectors (for instance, a first dense embedding vector) may be read from the first DRAM module (memory channel) in parallel with a second portion of the dense embedding vectors (for example, a second dense embedding vector) from the second DRAM module (memory channel). A first sum operation (or a set of sum or weighted sum operations) may be performed on the read first portion of the vectors and a second sum operation (or a set of sum or weighted sum operations) may be performed on the read second portion of the vectors.

The latter such approaches may work well when the memory controllers are discrete, interconnected modules (for instance, programmable logic or dedicated ICs), so that the first sum operation may be performed at the first memory controller and the second sum operation may be performed at the second memory controller. This may assist when the interconnection between the memory controllers represents a speed bottleneck. A result of the first sum operation (or operations) may be combined with a result of the second sum operation (or operations) subsequently (at one of the memory controller or in a separate location).

In other, more preferred approaches, multiple dense embedding vectors may be stored in each memory channel. Sum operations may be performed at a processing logic associated with a single memory controller, with the dense embedding vectors being read from the DRAM modules associated with that memory controller. In a particularly advantageous embodiment, multiple copies of each dense embedding vector may be stored in the DRAM modules (in the same and/or different banks). The number of copies may depend on a length of the dense embedding vector, for example with more copies being stored for shorter dense embedding vectors.

In any aspect, but less preferred, a distribution of the data across the individually-addressable memory channels (or modules) may be determined for fast random access, for example based on non-contiguous storage of the data (that is, splitting contiguous data between different memory channels or modules) and/or overlapping storage of the data (that is, repeating portions of the data across different memory channels or modules). Data may then be stored in accordance with the determined distribution.

Any aspect disclosed herein may be implemented by hardware (for example digital logic, programmable logic, electronic circuits or similar), software (a computer program, firmware or similar) or a combination. Any specific features or all features within an aspect disclosed herein may be combined with any other aspect.

BRIEF DESCRIPTION OF THE DRAWINGS

The invention may be put into practice in various ways, some of which will now be described by way of example only and with reference to the accompanying drawings in which.

DETAILED DESCRIPTION OF A PREFERRED EMBODIMENT

Figure 1:
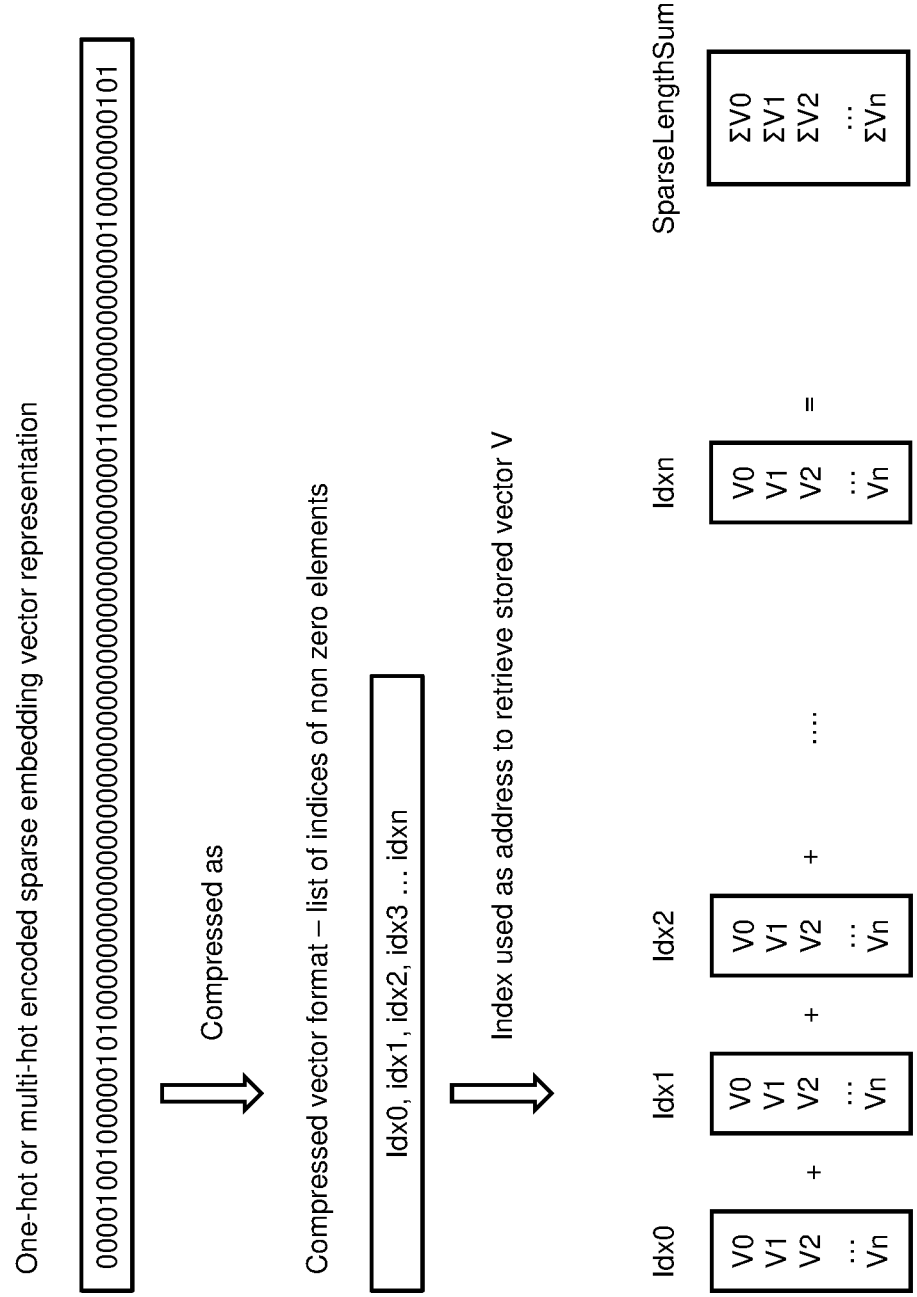
FIG. 1 schematically shows a conversion from sparse embedding vectors to a dense representation, as part of a sparse embedding vector sum operation.

An aspect of the disclosure stems from the realization that sparse embedding vector lookup operations using embedding tables may represent a speed limiting constraint on existing computational architectures for ML workloads, such as DLRM.

For example, the embedding tables in such workloads may be of extremely large size (gigabytes of data), and the lookups into them may be (almost) random. As such they present an extreme use case for CPU caching. In fact, a CPU cache between a CPU and DRAM may be detrimental to system performance when the memory access pattern is random or similar. Accessing memory in a (purely or pseudo) random access pattern is extremely inefficient for a CPU implementation. Most look ups will miss the CPU cache. Each cache miss requires subsequent operations to try different levels of cache, until eventually the CPU may be forced to update the cache in order to retrieve one address.

This is exacerbated by the architecture of the OS memory address space. As far as the user code (and the CPU) are concerned, the memory address space of the OS is very large (for example, $2^{64}$ bits). But this memory address space is actually "virtual memory", as the memory system in the CPU cannot simply take a virtual address and map it to a physical store of memory. The system will typically not comprise $2^{64}$ bits of dynamic random access memory. Instead, virtual memory addresses are translated into physical memory addresses by the memory system.

This is not a trivial process, so to speed it up, specialised caches are used to store the address-translation results for recently used memory pages. These are called Translation Lookaside Buffers (TLB). If the memory request misses the TLB it must go through the full translation process. Under high demand for lots of different memory addresses this can become a rate-limiting hardware bottleneck. The default page size for allocations is typically 4 kb, but using 4 kb pages for allocating multi-gigabyte tables uses a very large number of pages (256 k per gigabyte), and if the operation requires regular or constant jumping around this large memory space, there may be many TLB misses and a big slowdown in address translation.

In order to achieve true acceleration for an algorithm in a computer (for example a server in a data centre), all parts of the algorithm are desirably accelerated. It is not sufficient to accelerate only part of an algorithm, for example only the CNN layers, as non-accelerated operations will then throttle the full algorithmic performance. For instance, CNN layers can be very compute intensive and will run most efficiently on a suitable computational accelerator (for instance, a GPU, or specialised ML hardware). At the other end of the spectrum, embedding table operations really are very memory-intensive, compute-light operations and similarly may only run efficiently on suitable hardware.

In one respect, a device is proposed to provide efficient retrieval of dense embedding vectors for a given sparse embedding vector representation from an embedding table. Optionally the retrieved vector information is then summed. The device is a combination of software stack, embedded firmware and electronic subsystem to enable the acceleration of embedding table sparse embedding vector lookup operations. The device is an accelerator, designed to offload this workload from the CPU and work in conjunction with other ML accelerators to achieve an efficient system level performance.

In a generalized sense of a first aspect, there may therefore be considered a method and/or computer system for performing sparse embedding vector lookup operations, particularly for sparse vectors. This may be implemented in hardware (comprising a main processor, which may be part of a computing system such as a general purpose computer or server and/or a hardware accelerator), software (as a computer program, executed on a computing system) or a combination. The technique comprises: communicating data for a sparse embedding vector lookup operation to a hardware accelerator separate from a main processor (such as a CPU), the main processor having associated memory for data storage and the hardware accelerator comprising processing logic and dedicated memory that is separate from the memory associated with the main processor; storing the data for the sparse embedding vector lookup operation on the dedicated memory of the hardware accelerator; and performing the sparse embedding vector lookup operation at the hardware accelerator by reading at least some of the data for the sparse embedding vector lookup operation stored on the dedicated memory (which may, for example, comprise a plurality of dense embedding vectors, each referenced by a non-zero element of a sparse embedding vector).

Optionally, the sparse embedding vector lookup operation may be identified within instructions to be processed by the main processor. Additionally or alternatively, a result (which may be a partial result or a complete result) of the sparse embedding vector lookup operation may be communicated from the hardware accelerator to the main processor.

In general terms, sparse embedding vectors in accordance with the present disclosure may have a sparsity of at least (or greater than) 90%. In some cases, the sparsity may be at least (or greater than) 95%, 97% or 99%. In such sparse embedding vectors, especially when stored in a compressed format, the size of the sparse embedding vector may be small, for example up to 32 or 64 (non-zero) element indices, each index being stored using 8, 16 (fp16) or 32 (fp32) bits. The dense embedding vector elements, to which each non zero index relates, are also typically small, for example up to 32 or 64 elements, each element being stored using 8, 16 (fp16) or 32 (fp32) bits.

Further generalized features relevant to this aspect will be discussed below. More specific details regarding embodiments of a hardware accelerator device will first be discussed.

The device proposed by the present disclosure will accelerate the retrieval of dense embedding vectors from a compressed sparse embedding vector input and optionally sum the dense embedding vectors to implement the SparseLengthSum operator as shown in FIG. 1. Different input sparse embedding vectors will have to access different underlying embedding tables, of which there may be several to hundreds within a system. Also, the length of the input sparse embedding vectors need not be the same length between operations or between tables.

As the computation required for this operation is either zero or minimal, the rate limiting step for the computation is the time taken to retrieve data from the embedding tables themselves. In the embodiment described below, an accelerator is provided with sufficient memory to store the embedding tables (or least to provide sufficiently fast access the stored embedding table or a portion thereof) and firmware to access this data without a cache system in place that would otherwise throttle this design. An optimal acceleration system therefore desirably uses the fastest memory access possible for the memory lookup operation. This is in effect the memory bandwidth for the system, measured in GB/s for an access pattern that reads a randomly located set of a predetermined number of contiguous values for each dense embedding vector (64 in the DLRM algorithm, for example) from within an embedding table.

In addition to using the hardware accelerator to remove the caching mechanisms, a specifically arranged memory architecture is implemented to allow efficient data access. For a space and power efficient design with high bandwidth, it is desirable to store data using DRAM technology, such as Synchronous Dynamic Random Access Memory (SDRAM), including Double Date Rate (DDR) variants. For modern systems that would use memory of the type DDR3, DDR4, LPDDR3, LPDDR4, DDR5, related variants and other types of fast-access memory. This technology is currently the pervasive choice for computer systems. Static RAM (SRAM) technology provides better random access data retrieval, but is expensive and not as dense, so is not practical to use in a space-constrained platform, where significant storage is required. Non-volatile RAM (NVRAM) such as Flash technology offers significantly denser storage capacity, but access bandwidths are significantly less than DRAM or SRAM.

Figure 2:
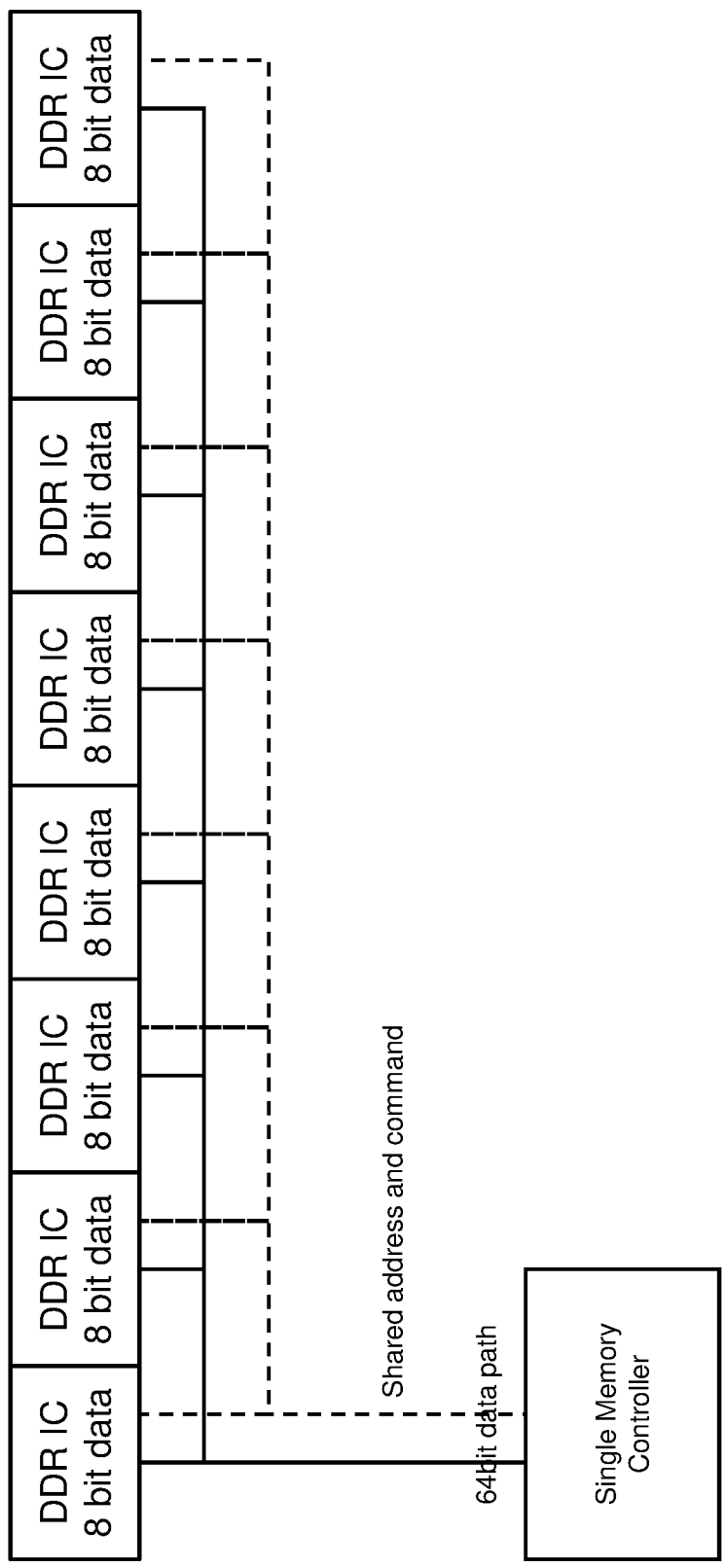
FIG. 2 depicts a schematic representation of an existing DRAM data storage architecture.

To explain the hardware accelerator of the disclosure and its advantages first, it is useful to consider existing systems for controlling memory, particularly DRAM. Referring to FIG. 2, there is depicted a schematic representation of an existing DRAM data storage architecture. This is in line with most general purpose memory systems used in computer systems today, which combine multiple DRAM chips into a bus to provide high bandwidth data retrieval with a low memory controller complexity and associated cost (in power, area, complexity). This may work well in general purpose machines, where large blocks of sequential data are typically required, for example when refreshing CPU caches.

A complication concerns the organisation of the DRAM, particularly (in the example case considered herein) where Synchronous DRAM (SDRAM) is used. The memory locations in an DRAM device are divided into large groups, referred to as banks. Each bank is further subdivided into smaller groups, referred to as rows. All the banks in a given DRAM device are the same size as each other and all the rows in a given device are the same size as each other. Each location has a unique address composed of multiple sub-components. These are: the Bank Address, to determine the bank; the row address, to determine the row in that bank; and the column address, to determine the location in that row in that bank. Sometimes, the Bank Address comprises (or typically consists of) two subcomponents: a Bank Group; and a Bank Address. Both parts may be required to determine the bank.

In order to read the data at a memory location, the memory controller issues commands and addresses to the DRAM device on a command and address bus. The DRAM device then retrieves the data from the memory location and then transfers the data to the memory controller on a data bus (typically separate from the command and address bus).

Each row in each bank can be in an active or a precharged (inactive) state. Only one row in each bank can be active at once. Multiple banks can have an active row. Data can be read from a memory location if the row in the bank containing the location is in the active state.

The process of reading a memory location typically requires three steps. The first step activates the row in the bank containing the memory location. The second step reads the data from the location. The third step precharges the row. It is possible to perform multiple reads at the second step if all the memory locations are all within the active row. It is also possible to leave a row in the active state and only precharge it when it is required to read a memory location in a different row of the same bank. It is also possible to combine the second and third steps above. The read can automatically precharge (autoprecharge) the row, once the data has been read.

For the first step above, the memory controller issues an activate command to the DRAM device. The Bank Address (and Bank Group, if used) and Row Address are provided with the activate command. For the second step above, the memory controller issues a read command, either with or without autoprecharge. The Bank Address (and Bank Group, if used) and Column Address are provided with the read command. (There may be multiple banks with an active row, so the Bank information is provided again within the read command.) For the third step above, the memory controller issues a precharge command. Again, the Bank Address (and Bank Group if used) are provided with the precharge command (as there may be multiple banks with an active row).

The nominal bandwidth of a DRAM device is typically defined by its data bus, specifically by the number of data lines multiplied by the bitrate of each data line. The internal workings of a DRAM device will normally support reads that fully utilise the nominal bandwidth, subject to the pattern of reads and subject to the DRAM not being in the process of executing certain housekeeping tasks such as refresh.

The DRAM has a number of timing constraints, all of which are desirably met to ensure correct operation. In order to achieve the nominal bandwidth (after allowing for housekeeping tasks), the pattern of reads should be such that the occurrences of the activate, precharge, and read commands (with or without autoprecharge) cause there always to be read data being transferred by the DRAM device to the memory controller via the data bus while at the same time meeting the DRAM timing constraints.

The three most significant SDRAM timing constraints that impact reads for SparseLengthSum operations are as follows. The first timing constraint is a minimum interval between successive activations to any two rows in a given bank. The second constraint is a minimum interval between the last read (before precharge) to any row in a given bank and the first read to any other row in the same bank. The third constraint limits the number of row activations that can occur, regardless of which banks they are in, in a given time period.

Figure 3:
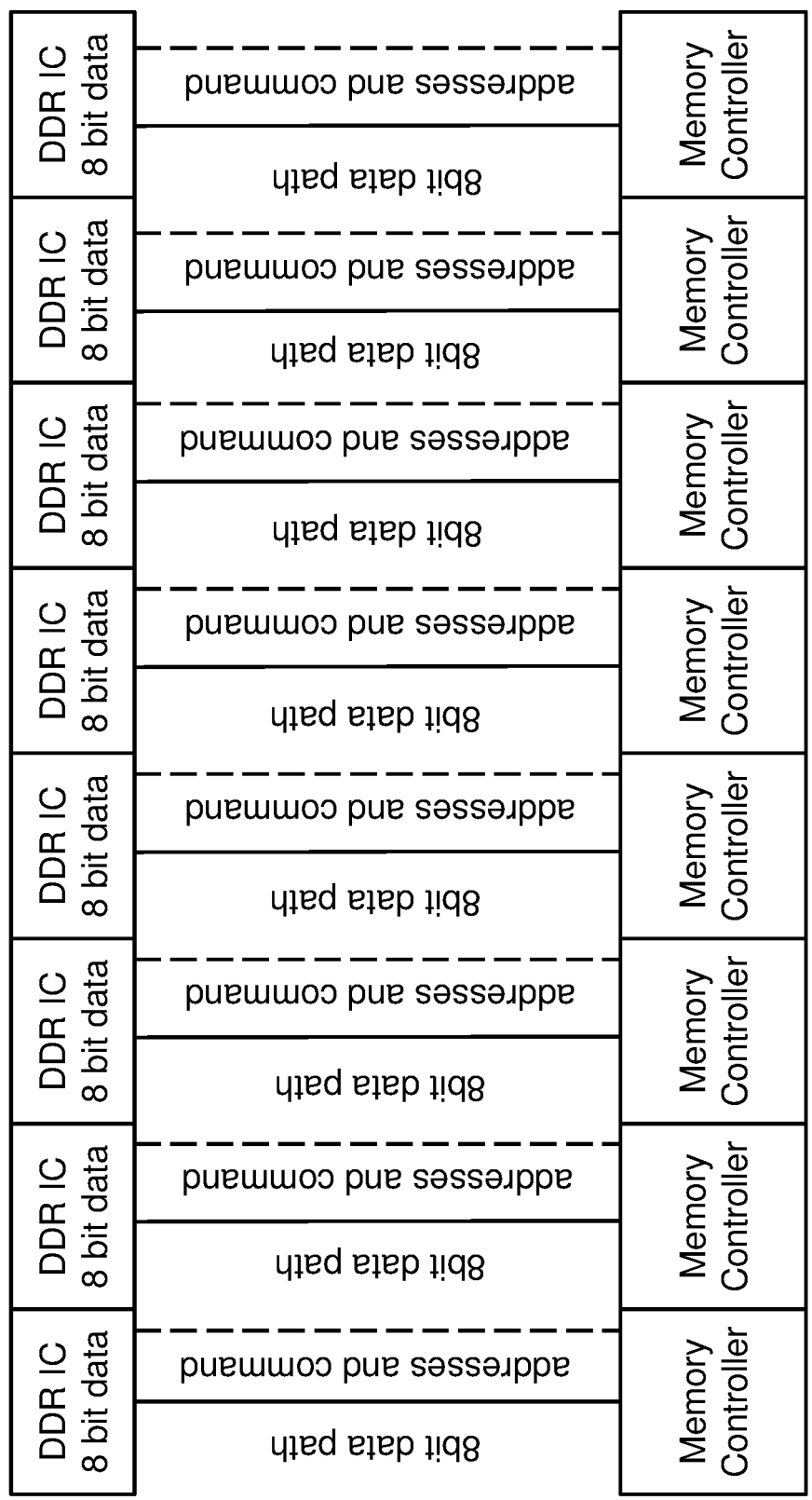
FIG. 3 illustrates a schematic representation of a DRAM data storage architecture in accordance with the disclosure.

Referring to FIG. 3, there is illustrated a schematic representation of a DRAM data storage architecture in accordance with the disclosure. This employs a memory system that uses one memory controller per DRAM chip or pair of DRAM chips, to provide an architecture heavily optimised for reading smaller blocks of data in a random access pattern. This design provides significantly better random access bandwidth for small blocks of contiguous data. Such a design may effectively be employed for operations based on sparse embedding vector lookup, such as vector summation. Parallel processing and/or pipelining may be implemented for faster operation.

This approach can address all three constraints of DRAM devices. In particular, it allows the number of read steps to read a vector to be much larger. The number of reads can be calculated as the number of bytes in the vector divided by the width, in bytes, of the data bus of the memory channel of which the device forms a part. Narrower channels, in which a data bus of a smaller bandwidth is used, are better.

The nominal bandwidth of a memory system may be defined as the total number of memory controllers multiplied by the number of data lines connected to each memory controller multiplied by the maximum transfer rate of each data line. Then for the same nominal bandwidth, the random access bandwidth is improved if the number of memory controllers is increased and the number of data lines to each memory controller is proportionally decreased.

The favouring of narrower memory channels at the cost of using more memory controllers is a counterintuitive approach. The cost of using a memory controller, particularly in the logic area for the controller and number of pins on the IC package, is high. For example, most systems would use a 64 bit memory configuration with one memory controller, whereas a system in accordance with the disclosure uses 2×32 bit DRAM memories (particularly, DDR devices) with two memory controllers to get better random access bandwidth but at higher cost.

Moreover, successive dense embedding vectors may be read from different banks in rotation, with the number of banks in the rotation being determined such that the DRAM constraint is met by the time the rotation has cycled through all the banks in the rotation. A copy of each dense embedding vector is desirable stored in each bank. Consequently, regardless of which dense embedding vector is to be read, it can be found in the current bank of the rotation. It should be noted that the SparseLengthSum indices (which determine which dense embedding vectors are read) are effectively random. If the number of banks required for the rotation is less than the number in the device, then banks can be grouped in sets, where the number of sets multiplied by the number of banks per set matches the total number of banks in the device. In this case the rotation is applied to sets rather than banks and there may only need to be a copy of each dense embedding vector in each set rather than in each bank.

For both approaches (narrow channels and rotation), a row is preferably precharged (typically using autoprecharge) immediately after the last read required for a given vector. This is especially with regard to the second constraint. If the precharge command is delayed then the effectiveness of these approaches may be reduced.

These approaches allow all three constraints identified above to be met, whilst utilising the nominal bandwidth of the DRAM device. Large numbers of read operations with successive dense embedding vectors being read from different banks reduces the impact of the first constraint. The second constraint causes a fixed period of time between the final read of one vector to the first read of another in the same bank (assuming it is in a different row). By increasing the numbers of reads, this fixed period of time is a smaller percentage of the overall time taken to read the vector. Narrower channels therefore cause a smaller percentage loss of bandwidth. Increasing the number of read operations may mitigate the effect of the third constraint.

The two approaches described, narrow channels and rotation, can be combined. In this case, the channel does not need to be as narrow as it would otherwise be to meet the DRAM constraints. Similarly, the number of banks (or sets) in the rotation does not need to be as high as it would otherwise be to meet the DRAM constraints.

For DRAM devices that split banks into bank groups there are additional DRAM timing constraints that may impact reads for SparseLengthSum operations. Typically for such devices, bandwidth is reduced unless consecutive reads are from different Bank Groups. In addition, the memory controller may have constraints that impact reads for SparseLengthSum operations. Some memory controllers cause there to be a minimum interval between reads to the same bank or groupings of banks (note that these groupings do not necessarily correspond to the DRAM device Bank Groups described above).

An approach for mitigating these two effects, and which is compatible with the approaches considered above, is for two or more rows to be active concurrently, with each row being in a bank in a different bank, Bank Group and/or grouping of banks and consecutive read commands cycling through the rows in rotation. The number of rows that should be active and read concurrently may depend on the memory controller. The number of rows should be such that by the time the rotation has cycled through all the rows, the minimum interval between reads to the same bank or groupings of banks, caused by the memory controller, has elapsed.

Another aspect (which may be combined with any other aspect or aspects disclosed herein) may also be considered in a generalized sense. This aspect also relates to performing sparse embedding vector lookup operations (as discussed above), particularly in which each non-zero element of a sparse embedding vector references a respective dense embedding vector (from a table of dense embedding vectors). In one sense, it may be considered that a plurality of memory controllers (which may be physical or logical) are controlled or operated to read data from more than one of a plurality of Dynamic Random Access Memory (DRAM) modules, particularly in parallel. Specifically, more than one dense embedding vector may be read at the same time. In particular, each memory controller and associated subset of the plurality of DRAM modules may define a memory channel. Then, more than one dense embedding vector may be read from multiple memory channels in parallel. The memory channels may each be individually addressable when associated with a memory controller. This aspect may be considered as a method, a device (a hardware accelerator), a system (a computer or computational system) or a combination thereof.

In another sense, it may be represented by a hardware accelerator for assisting (or being configured to assist) a separate processor (for example, a main processor or CPU in a computer system such as a server or similar) in performing sparse embedded vector lookup operations. The hardware accelerator comprises: a plurality of Dynamic Random Access Memory (DRAM) modules (for example, each module comprising or implemented as a packaged device or chiplet, for instance comprising an Integrated Circuit, IC, such that in cases each DRAM module could be individually addressable); and one or more memory controllers, each memory controller being configured to address a subset of the plurality of DRAM modules. Each memory controller and associated subset of the plurality of DRAM modules may define a memory channel. Processing logic may then be arranged to control the one or more memory controllers so as to read data (especially, more than one dense embedding vector) from more than one of the plurality of DRAM modules, particularly in parallel. For instance, more than one dense embedding vector may be read from multiple memory channels in parallel. This may include reading dense embedding vectors from more than one sparse embedding vector lookup operation from multiple memory channels in parallel and/or reading dense embedding vectors from a single sparse embedding vector lookup operation from multiple memory channels in parallel. The processing logic need not coordinate reads between multiple memory channels when handling different sparse embedding vector lookup operations, but this is possible in embodiments.

Additionally or alternatively, a dense embedding vector may be read from a contiguous memory portion of one of the plurality of DRAM modules in a plurality of read operations. The processing logic may be centralized or distributed (for example, locally to each of the memory controllers, especially when the one or more memory controllers are provided as individual (for example, physically separate) modules. The use of multiple memory controllers and/or multiple memory channels may provide significant benefits for random access over existing, single controller designs. Designs according to the disclosure may be faster at random access (improving random access bandwidth), flexible for a range of applications and cost-efficient to implement.

The number of read operations to read a dense embedding vector from a contiguous memory portion of a DRAM module memory may depend on the size of the dense embedding vector and the size of the data channel for the memory channel between the DRAM module and its associated memory controller. The use of multiple memory controllers, with fewer DRAM modules per memory controller may reduce the size of the data channel between each memory controller and its associated DRAM modules. The dense embedding vectors being stored in continuous (or contiguous) blocks of memory may have a relatively low size, in some instances less than one row of memory in a DRAM module. Existing memory designs may allow such a data construct to be read in a single read operation.

A number of optional and/or preferable features may be considered according to any aspect. For example, each of the plurality of DRAM modules may Synchronous DRAM (SDRAM) module, in particular, a Double Data Rate (DDR) SDRAM module. DRAM modules with the fastest access speeds may further improve performance.

Each memory controller is preferably configured to address no more than 4 DRAM modules (for DRAM modules with no more than an 8 bit interface) and more preferably no more than 2 DRAM modules. Each memory controller may be configured to interface with a subset of the plurality of DRAM modules via a data bus of no more than 40 bits or 32 bits (more preferably no more than 16 or 8 bits). This may further increase the number of read operations to read a dense embedding vector.

Each DRAM module typically has a respective plurality of memory addresses, divided into multiple rows and/or multiple banks (each bank generally comprising multiple rows). A bank group or group of banks may be defined by multiple banks in certain cases. The processing logic is advantageously arranged to control each memory controller so as to read successive dense embedding vectors from different banks (and in some cases, from different bank groups or groups of banks). Additionally or alternatively, the processing logic may be arranged to control each memory controller so as to activate multiple rows in parallel, the multiple rows being in different banks (and in some cases, from different bank groups or groups of banks). Then data may be read from each of such activated multiple rows in succession. In particular, data read operations from each of the activated multiple rows may be interleaved. For example, four words (1-4) may be efficiently read from four banks (A-D), by reading A1, B1, C1, D1, A2, B2, . . . , C4, D4.

In embodiments, there is further provided an Input/Output (I/O) controller, arranged to receive processing data from the separate processor. In some cases, the processing data may comprise data for storage in the plurality of DRAM modules. The processing data may comprise a plurality of dense embedding vectors for storage in the plurality of DRAM modules.

The processing logic may be further configured to perform a calculation (for example, a sum or a weighted sum operation) on the data read from the plurality of DRAM modules. The processing logic may then be configured to provide a result of the calculation to the separate processor via the I/O controller.

In certain cases, the processing data comprises: information representing non-zero indices of at least one sparse embedding vector (for the calculation). Then, the processing logic is beneficially configured to read the dense embedding vectors from one or more of the plurality of memory channels and/or DRAM modules, in particular based on the list of indices (where each index identifies a respective dense embedding vector). The processing logic may additionally be configured to perform the calculation based on the processing data (the list of indices and, in some cases, weighting instructions and/or weighting coefficient data). The processing data may comprise information representing non-zero indices of more than one sparse embedding vector, in cases and the design may then handle multiple sparse length sum operations at once.

The processing logic is optionally arranged to control the one or more memory controllers so as to store information representing a plurality of dense embedding vectors across the plurality of DRAM modules. Advantageously, the processing logic is arranged to read at least a portion of the information in parallel (in particular, two different dense embedding vectors may be read in parallel). Then, the processing logic may be further arranged to perform a sum operation using the read at least a portion of the plurality of dense embedding vectors.

Optionally, the processing logic is further arranged to control the one or more memory controllers so as to carry out a repeated parallel read of data stored in the plurality of DRAM modules, for example using pipelining. This may further enhance performance.

In some implementations (as will be discussed below), the one or more memory controllers (and preferably at least a portion of the processing logic) are provided as single device, such as an Application Specific Integrated Circuit (ASIC). In other implementations, the one or more memory controllers are provided as discrete, interconnected (for example, serially interconnected) memory controller modules (which may each comprise one or more memory controllers). Then, the processing logic may be distributed between the memory controller modules. The discrete memory controller modules may each be implemented in digital logic, especially programmable or re-programmable logic, for instance a FPGA, or in a specially designed ASIC (single ASICs may be designed to be chained together to give better physical arrangement on a PCB, and/or options for system extensibility).

Additional specific details of preferred embodiments will again be discussed. Further generalized details of the invention will then be presented below.

Figure 4:
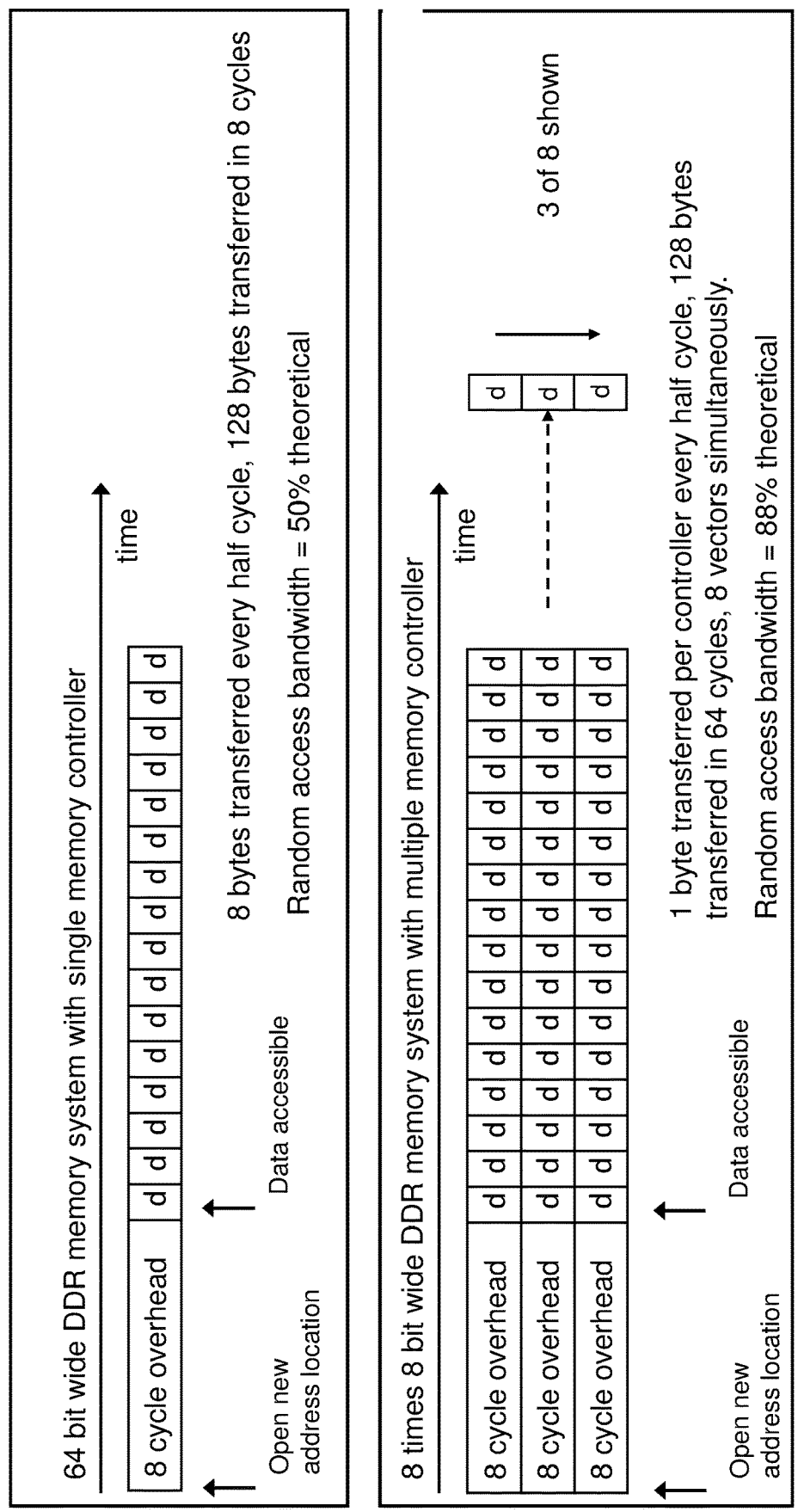
FIG. 4 schematically shows an overhead effect on switching memory location comparing the architectures of FIGS. 2 and 3.

Referring to FIG. 4, there is schematically shown an overhead effect on switching memory location comparing the architectures of FIGS. 2 and 3. When accessing data from DDR SDRAM, the penalty for switching between non-contiguous areas of memory can be high (in the order of 4 to 8 DRAM cycles or greater, depending on exact DRAM specifications). This reduces efficiency of available bandwidth to as much as 25% or lower. Being able to read small areas of contiguous memory is therefore highly desirable in the design of the accelerator platform.

In the DLRM algorithm specifically considered, contiguous data is limited to approximately 128 to 256 bytes (assuming vector lengths of 64 values in 32fp format, 32 values in 32fp format or 64 values in 16fp format). For these relatively small blocks, it may be more efficient to read multiple small blocks of data, in parallel with multiple DDR controllers that can all switch to different memory locations to read narrowly located small blocks of data, than it is to read from a wide data width system with common address and command signals. The overhead for switching address locations across the system is reduced substantially, potentially giving significant improvement in random access memory bandwidth.

Figure 5:
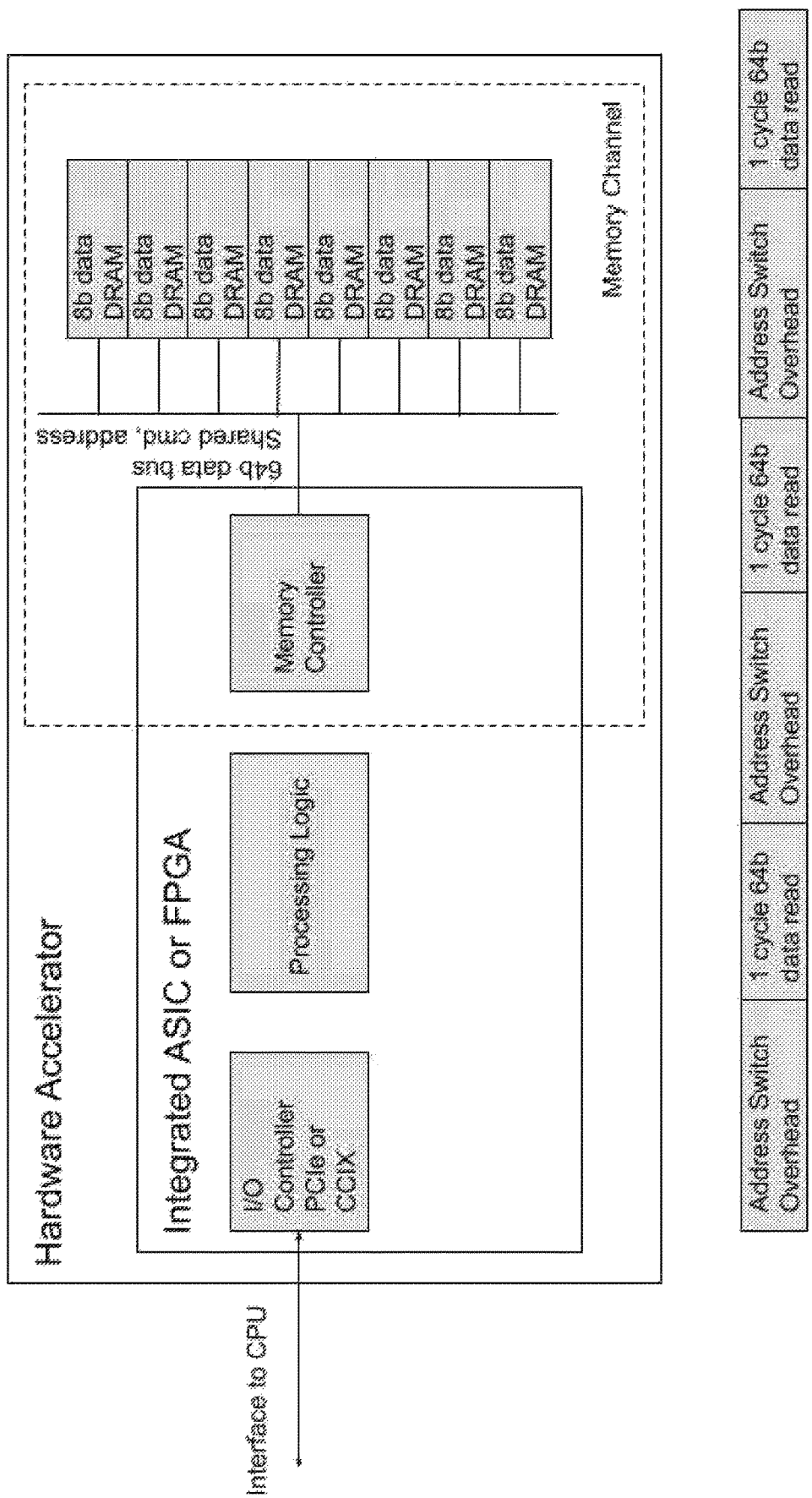
FIG. 5 illustrates schematically switching overhead in more detail for architectures in accordance with FIG. 2.

Referring to FIG. 5, there is illustrated schematically switching overhead in more detail for architectures in accordance with FIG. 2. A hardware accelerator in line with such a configuration comprises: an I/O Controller for interfacing with a CPU; processing logic for interfacing the I/O controller with the memory system; and a memory controller, configured to interface with all of the DRAM modules (in this example, 8 DRAM modules, each having an 8 bit data line). A 64 bit data bus interfaces between the memory controller and the 8 DRAM modules. This defines a single memory channel, as illustrated. Such an architecture may provide good bandwidth when many consecutive data bytes are read from a continuous block of memory. In that case, the address switch overhead is only a small fraction of the overall read time. However, this approach is inefficient for short memory reads, for instance of one or two cycles.

The performance of the accelerator for performing sparse embedding vector lookup operations (such as sparse length sum operations) may be directly proportional to the achieved bandwidth for reading the dense embedding vectors from memory. As can be seen, the maximum bandwidth of a DDR operation when configured to read a random access address pattern is limited because of the time taken to switch banks to a new address location in the memory. This is likely to happen at the start of every new dense embedding vector location due to the large size of the embedding tables used, resulting in a large vector address space and random nature of the access into this address space.

Figure 6A:
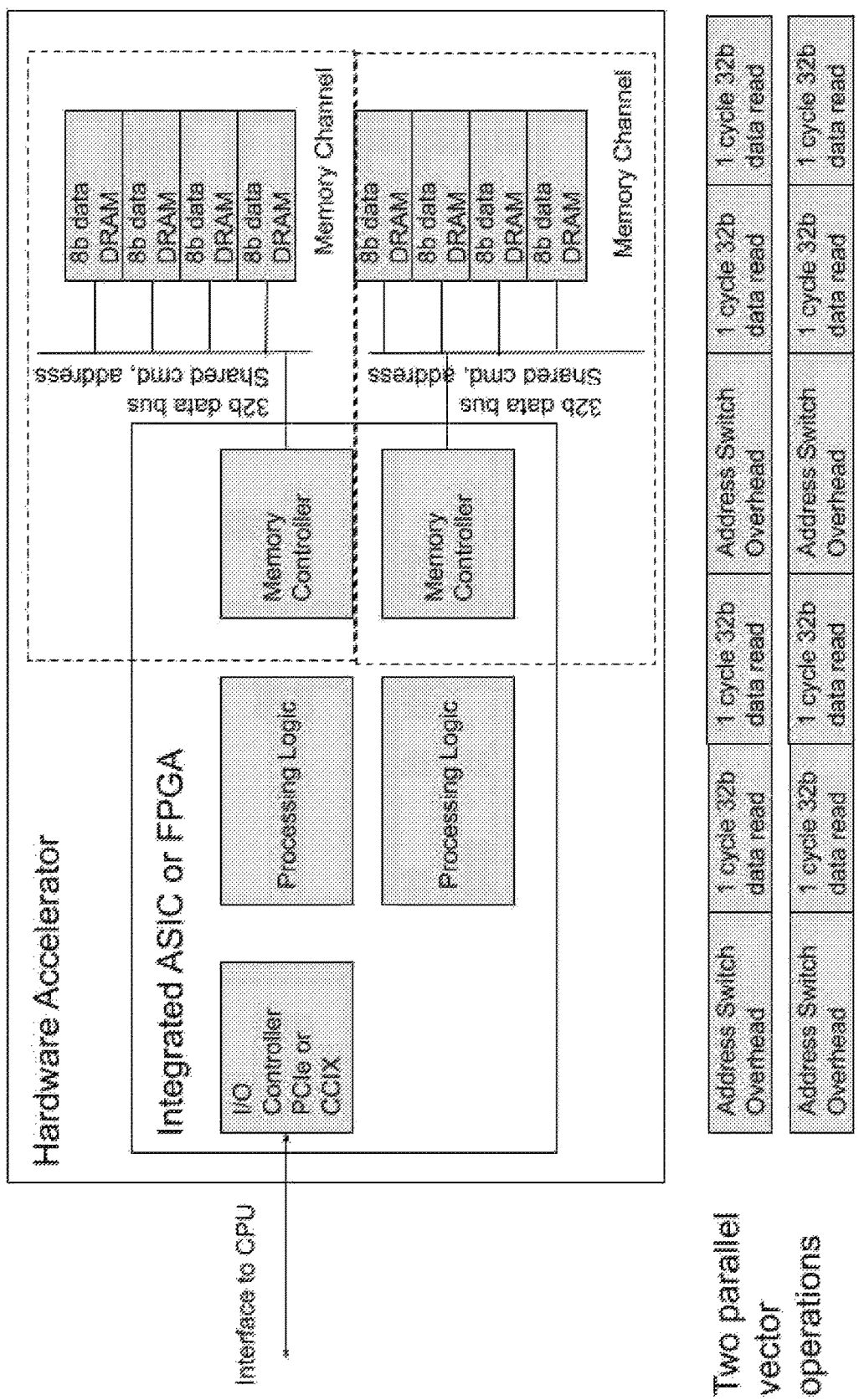
FIG. 6a illustrates schematically switching overhead in more detail for a first architecture in accordance with the disclosure.

With reference to FIG. 6a, there is illustrated schematically switching overhead in more detail for a first architecture in accordance with the disclosure. This architecture is similar to that shown in FIG. 3, as discussed above. The hardware accelerator comprises: an I/O Controller for interfacing with a CPU; two memory controllers, each configured to interface with four of the DRAM modules (each DRAM module having an 8 bit data line); and two sets of processing logic, each for interfacing the I/O controller with a respective memory controller. A 32 bit data bus interfaces between each of the memory controllers and the respective four DRAM modules. Each memory controller and associated group of four DRAM modules defines a distinct memory channel (with the respective interfacing data bus). Compared to the system shown in FIG. 5, more time is spent reading data during short random access read operations, giving better bandwidth in such cases. In other words, the address switch overhead is only a small fraction of the overall read time. This contrasts with the wide bus system of FIG. 5, in which the address switch overhead becomes a much larger fraction of the overall read time. As can be seen, two parallel dense embedding vector read operations are possible with this hardware accelerator. This means that the effective bandwidth in the read cycles remains the same as the case of FIG. 5. A design such as shown in FIG. 6a can be implemented using a Kintex® Ultrascale+® FPGA, marketed by Xilinx, Inc.

Figure 6B:
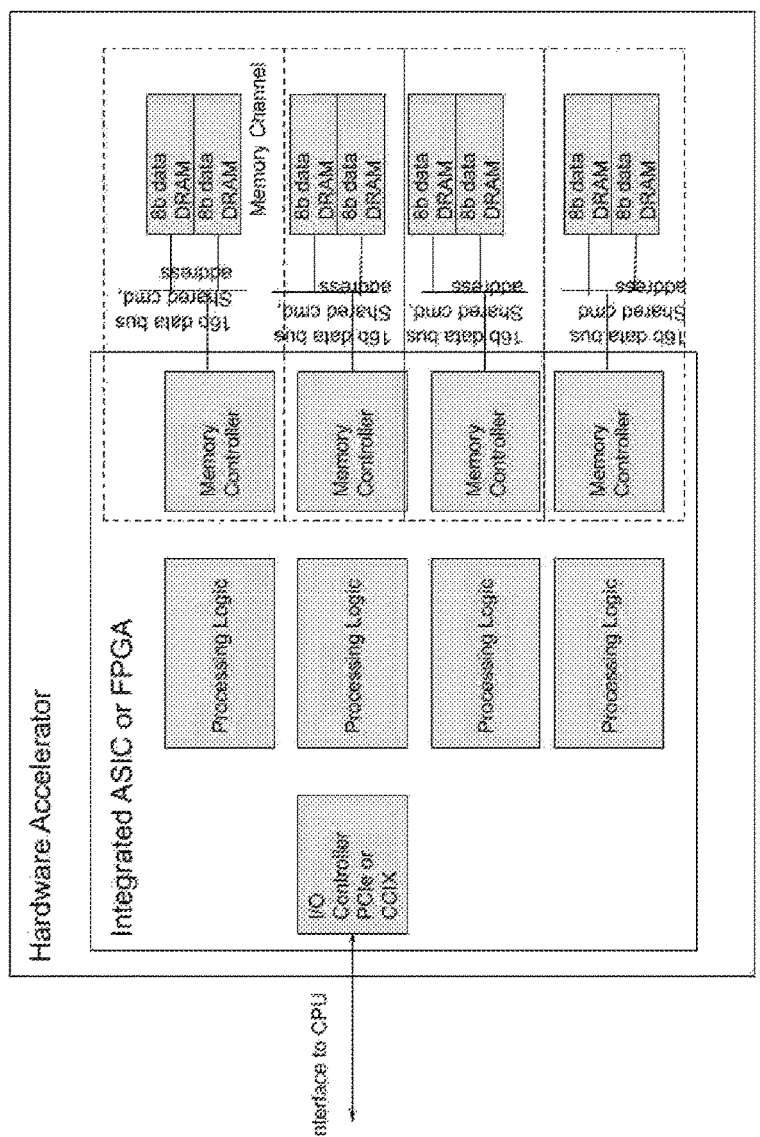
FIG. 6b illustrates schematically switching overhead in more detail for a second architecture in accordance with the disclosure.

Referring now to FIG. 6b, there is illustrated schematically switching overhead in more detail for a second architecture in accordance with the disclosure. The hardware accelerator comprises: an I/O Controller for interfacing with a CPU; four memory controllers, each configured to interface with two of the DRAM modules (each DRAM module having an 8 bit data line); and four sets of processing logic, each for interfacing the I/O controller with a respective memory controller. A 16 bit data bus interfaces between each of the memory controllers and the respective two DRAM modules. Each memory controller and associated group of two DRAM modules defines a distinct memory channel (with the respective interfacing data bus). Compared to the system shown in FIG. 6a, even more time is spent reading data during short random access read operations, giving even better bandwidth in such cases. In other words, the address switch overhead becomes a smaller fraction of the overall read time. Four parallel dense embedding vector read operations are possible with this hardware accelerator, such that the effective bandwidth in the read cycles remains the same as the case of FIG. 5. A design such as shown in FIG. 6b or even further using 8 memory channels with a 16 bit bus for each, may be implemented using an Arria® 10 GX480 FPGA, marketed by Intel Corporation. This may also be possible when implementing the hardware accelerator using an ASIC and it may even be possible to use 16 memory channels with an 8 bit bus for each (as shown in FIG. 3).

As discussed above, the indices used to indicate non zero values in the sparse embedding vector are random, so the memory pattern used to access the dense embedding vectors associated with those indices is random access. In view of this, it is aimed to read as many read cycles of data per address change as possible, to best amortize the cost of the change of address. It is also preferred to hold data as narrower but longer blocks of data than wider and shorter blocks of data. This is achieved by preferentially using narrower DDR memory configurations than a system configured to read less random and/or larger and more contiguous blocks of data.

The hardware accelerator according to the disclosure can therefore be divided into a plurality of sub-accelerators, each sub-accelerator comprising: processing logic; a single memory controller; and a plurality of associated DRAM modules. Each sub-accelerator effectively operates independently, with each processing logic operating its own sparse embedding vector lookup and summation via the associated memory controller. The controlling software (operated at the CPU or on-board the hardware accelerator) requests lookups of each sub-accelerator. These are generally active in parallel, to increase overall throughput of the system, but this is not necessarily always true or necessarily in any way co-ordinated.

Figure 7:
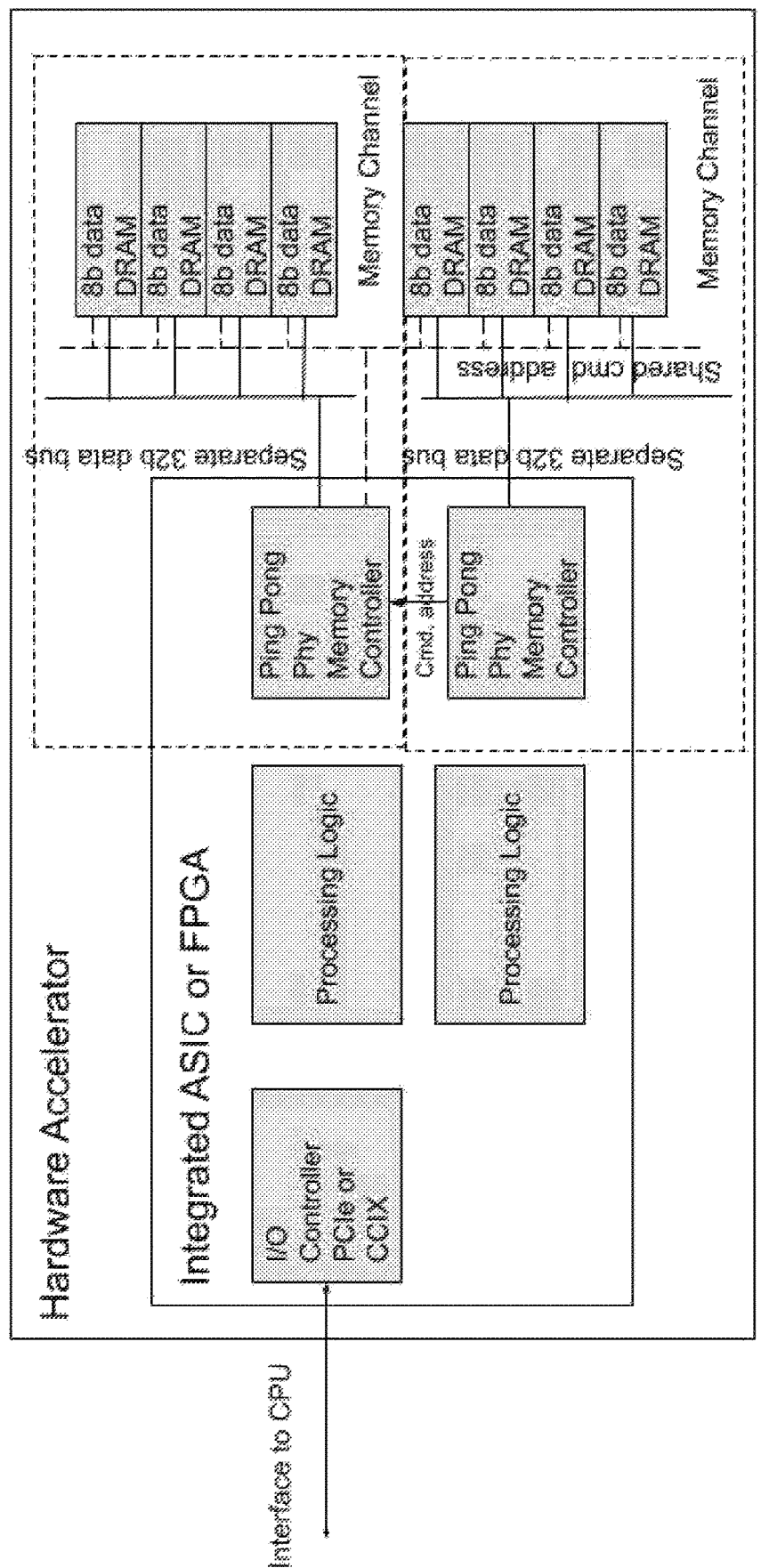
FIG. 7 illustrates schematically a third architecture in accordance with the disclosure.

Next referring to FIG. 7, there is illustrated schematically a third architecture in accordance with the disclosure, using a shared address and command bus. This further optimisation uses a "Ping pong Phy" mode. This is a technique for multiple memory controllers to share address and command buses. It assumes the memory controllers that are sharing the address and command bus are within the same device. This technique reduces the number of pins required on the device.

As an example, consider two memory controllers, each controlling one DRAM device. Using this technique, each DRAM device has a dedicated data-path connection to its memory controller but a shared address and command path to its memory controller. The address and command path is shared on a time basis. This sharing does not necessarily reduce the memory system bandwidth (or if it does, it may do so at least only marginally), because even for random access read operations, each controller only needs about 50% of the bandwidth of the shared address and command bus in order to utilise 100% of its data path.

FIG. 7 shows two memory controllers, each controlling and interfacing with four DRAM devices, thereby defining two memory channels. Each memory channel has its own data bus between the memory controller of the memory channel and its associated DRAM modules. However, a command and address path is shared between the memory controllers, for example in a timeshared way.

In practice, not all signals of the address and command buses are shared (or can be shared in cases). A small number, for example the DRAM device select, are dedicated connections between DRAM devices and their associated memory controller. The "Ping Pong Phy" mode is a widely supported mode of operation in FPGA devices. It helps to reduce the pin cost of having multiple memory controllers in the system. Specifically, it may make it easier to use more memory controllers in an IC design, where a small IC package is required. This is because the size of the IC package is often determined by the number of pins that are required to be accessible on the package.

Another optimisation may store multiple copies of the vector data in memory in an optimised layout. Each vector that a given memory controller can read is stored in multiple locations in the memory connected to that memory controller. The number and location in memory of these multiple copies is such that, regardless of which of the dense embedding vectors are requested to be read and regardless of the order in which the requests are received, the dense embedding vectors can be read without any loss of bandwidth caused by the random nature of the requests. This approach is different from a cache, where data may be duplicated at runtime based on a usage pattern. In this approach, data is always duplicated to enable the controlling entity to choose to read from a more favourable location.

For DDR4 memory, for example, the number of copies to achieve a benefit is a minimum of 2. This increases for shorter vectors and the optimal number of copies is determined by the length of the dense embedding vector. A practical implementation can support at least 8 copies in each memory. The number of copies that should be used is advantageously configured from the software at runtime.

Figure 8:
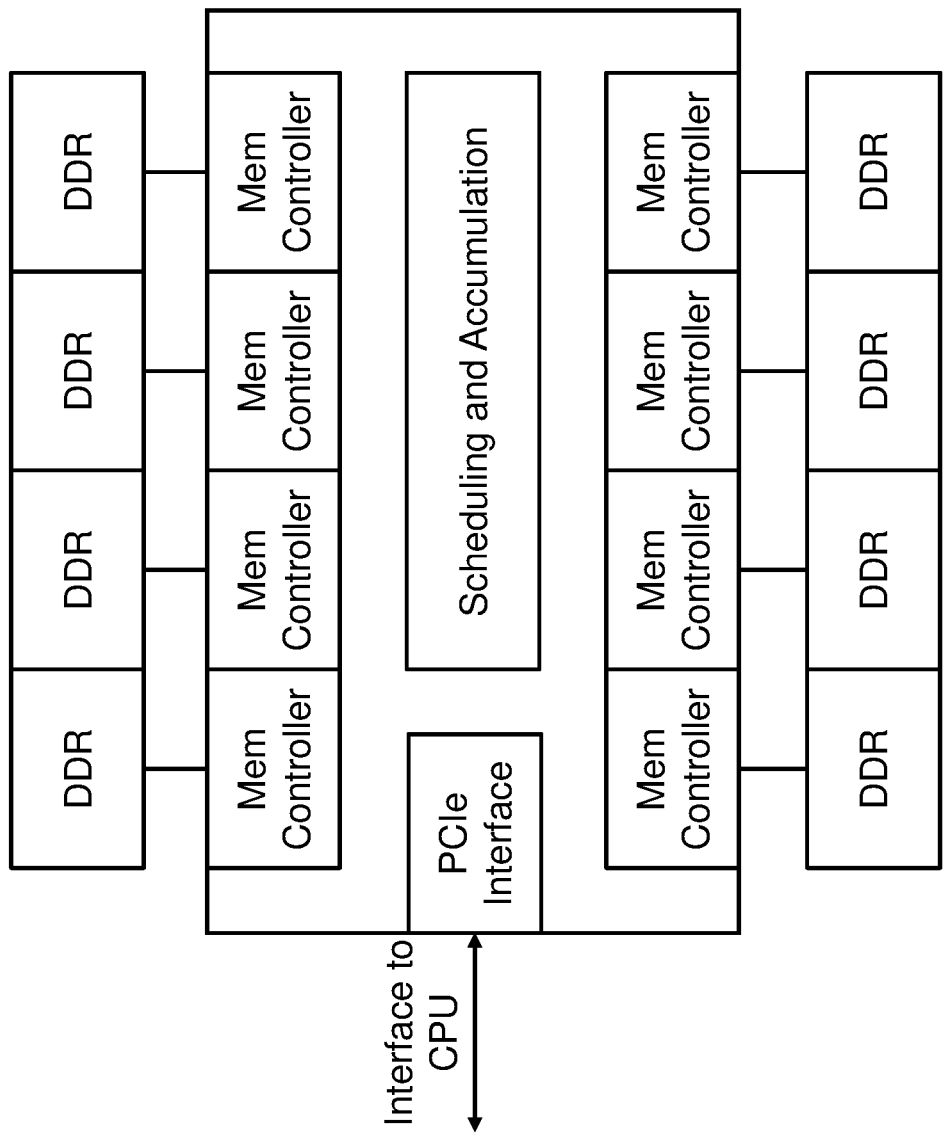
FIG. 8 shows a schematic block diagram of a first DRAM data storage implementation in accordance with the architecture of FIG. 3.

Referring next to FIG. 8, there is shown a schematic block diagram of a first DRAM data storage implementation in accordance with the architecture of FIG. 3. This depicts a highly effective realisation of this memory architecture, by generating an ASIC to encapsulate the multiple memory controllers and a system of logic to manage the parallel fetching of multiple vectors from each DDR Integrated Circuit (IC) in parallel. The number of DDR controllers used in the ASIC (and associated external DRAM) determines how many dense embedding vectors can be fetched simultaneously and the performance that the system can achieve. The ASIC should contain as many controllers as possible, within the area and power constraints dictated by the system. A limiting factor on ASIC implementations is likely to be the size of the package that can be used to accommodate the number of pins needed for a large amount of DRAM controllers. We may also want to have a system with multiple connected ASICs, i.e. same system as FPGA but using dedicated ASICs that could be joined together to give a better physical arrangement on a form factor constrained board such as M2.

Figure 9:
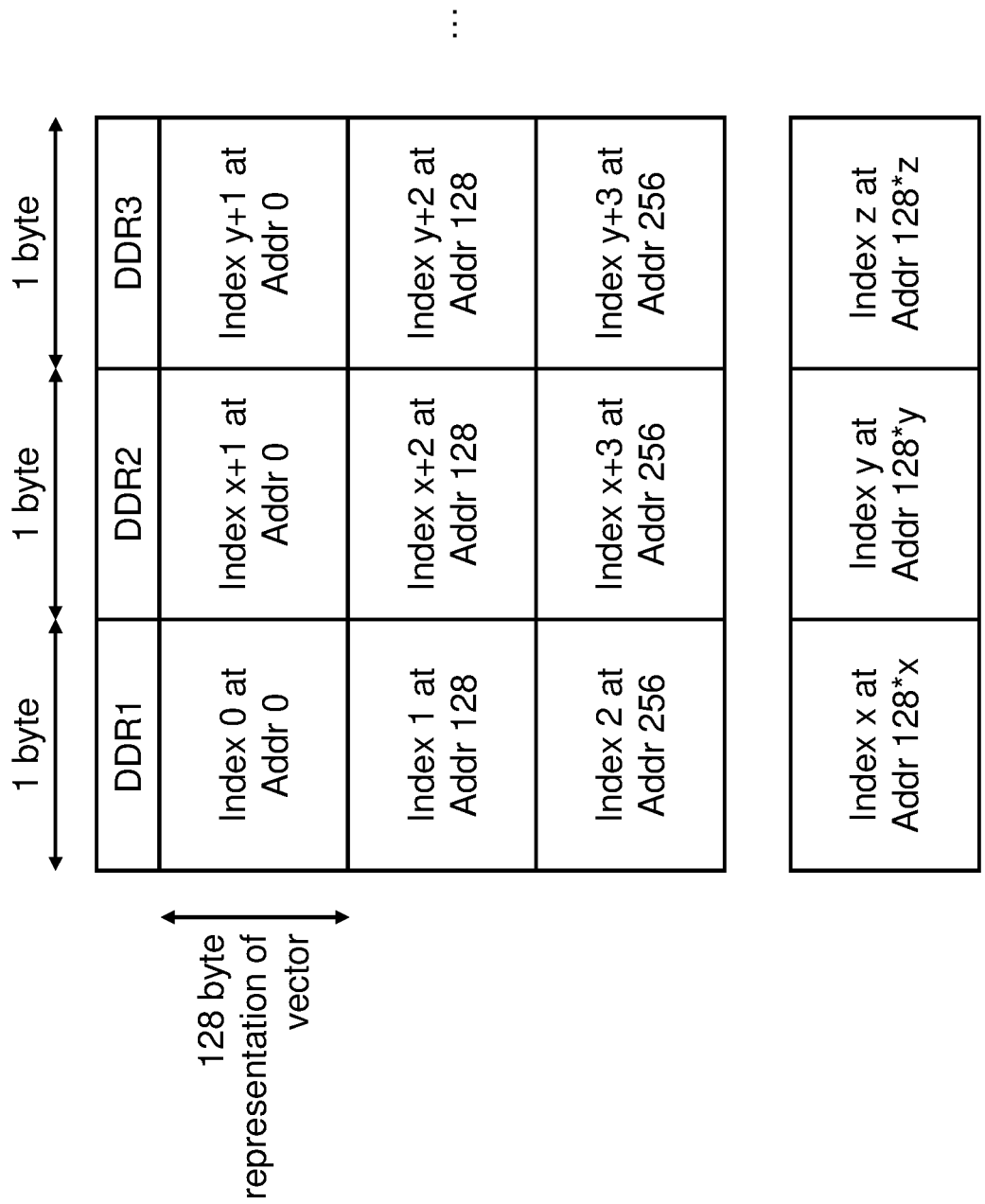
FIG. 9 schematically depicts a memory layout for random access bandwidth for use with an implementation according to FIG. 8.

Referring to FIG. 9, there is schematically depicted a memory layout for random access bandwidth for use with an implementation according to FIG. 8. This shows one method for laying out dense embedding vectors into memory for efficient processing. Complete dense embedding vectors are stored in contiguous memory in each memory channel, with indices starting in the first DRAM, incrementing through that RAM until full, and then populating the next memory channel in the chain.

Another generalised aspect (which may be combined with any other aspect or aspects disclosed herein) may also relate to performing sparse embedding vector lookup operations, particularly in which each non-zero element of a sparse embedding vector references a respective dense embedding vector (from a table of dense embedding vectors), with a hardware accelerator as herein discussed. multiple copies of each dense embedding vector (or at least one dense embedding vector or some dense embedding vectors) of the plurality of dense embedding vectors may be stored in one of the plurality of memory channels (for example in the same or different banks of the DRAM modules). The storage of multiple copies and the retrieval of one of multiply-stored copies may be considered individual aspects and their combination may be considered a further aspects. As with other aspects, these aspects may be considered as a method, a device (a hardware accelerator), a system (a computer or computational system) or a combination thereof and/or may be combined with other aspects disclosed herein.

For example, further optional features may be considered in respect of any aspects herein disclosed. Multiple copies of each dense embedding vector (or at least one vector or some vectors) of the plurality of dense embedding vectors may be stored in one of the plurality of memory channels. The processing logic may determine (by its own computations or an identification based on received instructions, in which the computations were performed outside the hardware accelerator) memory addresses for storing one or more copies of each received dense embedding vector in at least one of the memory channels. Additionally or alternative, the location (memory addresses) of the multiple copies of the vector may be known by the processing logic and the selection of which copy of the vector to read may be determined by the processing logic in some embodiments. A number of the multiple copies to be stored for each dense embedding vector of the plurality of vectors may be determined based on a length of the respective dense embedding vector. For example, more copies may be stored of shorter vectors than are stored of longer vectors.

The processing logic may be configured to determine which instance from a number of multiple copies to read at on any given operation, in order to improve memory access time. For example, the processing logic may configured to determine which one of the multiple copies of the dense embedding vector to be retrieved, based on previous read operations of the memory channel. In other words, the processing logic may be configured to determine which copy of a dense embedding vector to access, from a number of the stored multiple copies of a dense embedding vector, for instance so as to read from a specific memory bank or group of memory banks within a DRAM module For each memory controller, there may be provided at least one data interface (for example, a data bus), each data interface providing a dedicated data path between the memory controller and an associated one or more of the plurality of DRAM modules (typically all DRAM modules associated with the memory controller). In some embodiments, there may also be provided a shared address and command interface for multiple memory channels (and hence, multiple memory controllers), between the memory controllers of the multiple memory channels and more than one associated DRAM module from the multiple memory channels (in particular, across at least two different memory channels and more typically, across all the DRAM modules in the multiple memory channels). The shared address and command interfaces are beneficially time-shared between the multiple memory channels.

A number of generalized implementations (in the senses discussed above) may also be considered. For example, processing logic may be further arranged to control the one or more memory controllers so as to: store at least a portion of a first dense embedding vector in a first DRAM module of the plurality of DRAM modules; store at least a portion of a second dense embedding vector in a second DRAM module of the plurality of memory channels (DRAM modules controlled by different memory controllers); and read the stored at least a portion of the first vector from the first memory channel (DRAM module) in parallel with the stored at least a portion of the second vector from the second memory channel (DRAM module). This may efficiently readout and/or process large batches of data in single controller embodiments. Optionally, the processing logic may be further configured to perform a sum operation on the read at least a portion of the first vector with the read at least a portion of the second vector. Other specific implementations will now be discussed.

Figure 10:
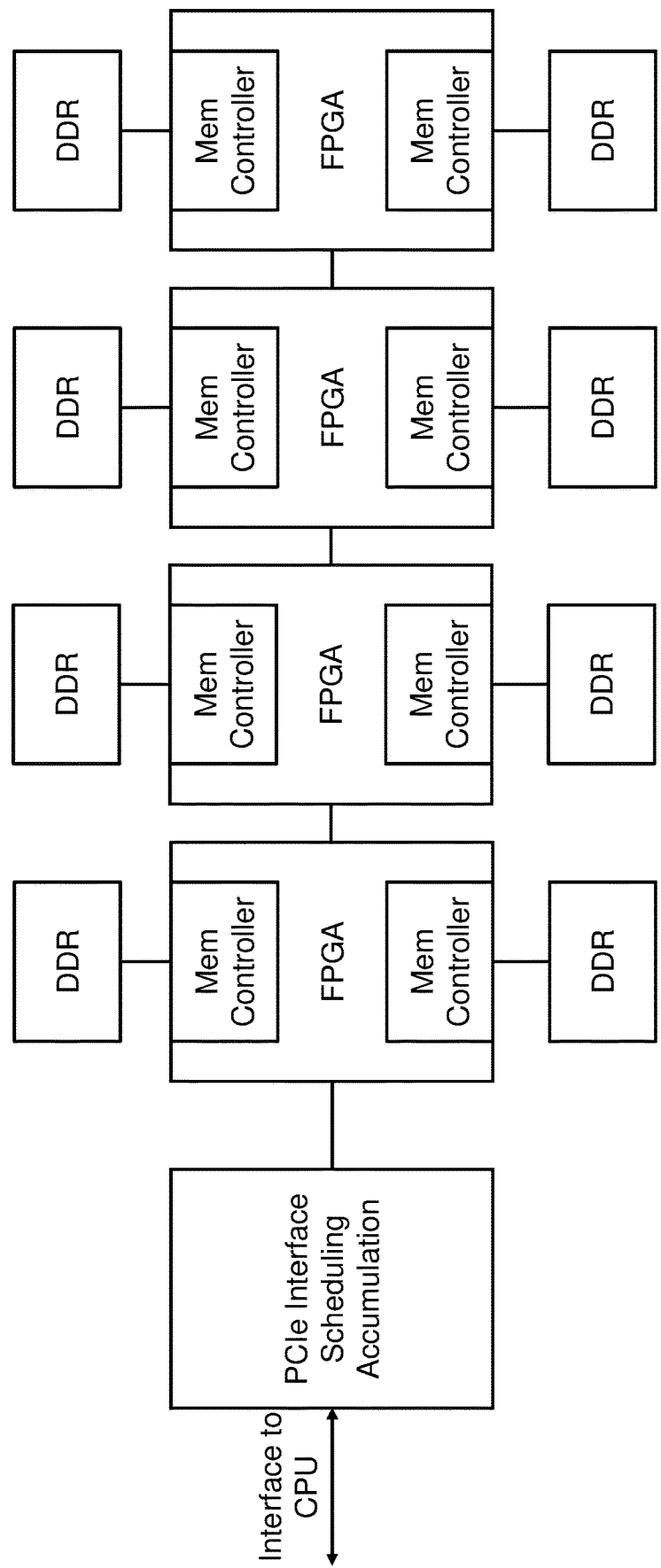
FIG. 10 shows a schematic block diagram of a second DRAM data storage implementation in accordance with the architecture of FIG. 3.

Reference is now made to FIG. 10, in which there is shown a schematic block diagram of a second DRAM data storage implementation in accordance with the architecture of FIG. 3. This is an alternative implementation of the accelerator, based on commercially available Field-Programmable Gate Array (FPGA) technology. The FPGA devices can be programmed to implement DDR memory controllers, with the number being available dependent on characteristics of different FPGA variants. For the design shown, small FPGA devices are used that will fit within a narrow form-factor such as an M.2 form-factor. These devices typically have support for one or two DDR memory controllers. The limitation may be a combination of available pins on the device and the logic or hard memory controller circuitry within the device.

Using this approach, a system can be achieved with a large number of DDR memory controllers by using multiple FPGA devices and connecting them together to transfer data as part of a larger system. As many FPGA and DDR subsystems may be placed on the accelerator as can be fit within the physical form-factor constraints.

In the design shown in FIG. 10, two DDR controllers are placed on an FPGA, connecting four FPGAs into a chain to transfer data back to a controlling entity. Then, four FPGAs and associated DDR (not shown) are repeated in the design, providing a second subsystem to double the performance. The summation of the dense embedding vectors can be done locally per FPGA or at a central point of FPGA interconnection, or once data is returned to the CPU, or a combination of these.

Due to the interconnection of the FPGA devices, a constraint on system performance may be imposed. The interconnect bandwidth available between FPGA devices may be lower than the bandwidth achievable from the RAM. This means that data read from DDR is preferably not moved arbitrarily around the system, but first the data rate is reduced. For this application, data reduction is achieved by summing or partially summing the vectors before data can be transferred across the system.

Figure 11:
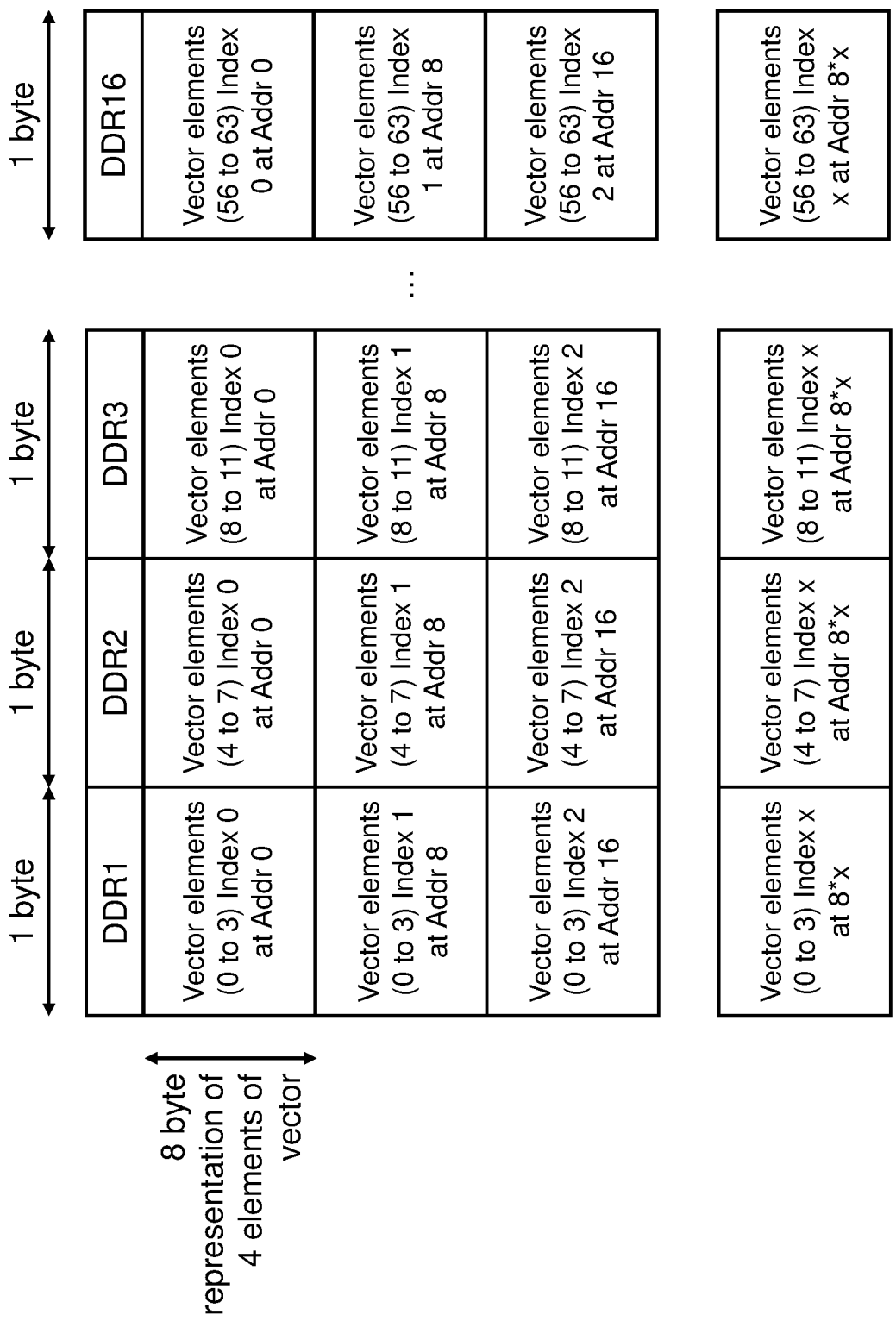
FIG. 11 schematically depicts a memory layout for random access bandwidth for use with an implementation according to FIG. 10.

Referring to FIG. 11, there is schematically depicted a memory layout for random access bandwidth for use with an implementation according to FIG. 10. The desire to reduce data before transfer for the FPGA implementation of FIG. 10 implies that data should be stored differently in memory to an ASIC implementation. FIG. 11 represents an efficient layout that allows random access bandwidth to be maintained, while a data reduction of four can be achieved before transfer. This scheme allows vector elements that will be accumulated to be read from the same RAM connected to the same physical FPGA and accumulated before the data must be transferred.

The accelerator topology achieves high bandwidth by ensuring all DDR interfaces are busy all of the time. In the limit, this can be achieved by duplicating all data into all DDR memories, but this may not always be practical in a space constrained system, as some of the memory tables are large and so complete duplication of the data may not be realisable. A more practical approach may be to analyse the model ahead of time and duplicate parts of the table that are more commonly accessed into different FPGAs. The duplication of parts of the table into different individual DRAM devices is likely to assist in showing further increasing system performance.

Considering sparse embedding vector lookup operations, for example in a DLRM algorithm, the non-zero indices are effectively random throughout the sparse embedding vector. As discussed in the commonly-assigned co-pending International Patent Application No. PCT/GB2019/051435 (published as WO-2019/224554), overlapping sparse vectors can reduce the stalling in a system handling sparse inputs. Overlapping embedding tables by 25%, 50%, 75% may provide on average a low probability of having idle DRAM controllers within the system. Another possible memory layout is to duplicate a single table into each DRAM in the hardware accelerator. Then, a system with 8 DRAM modules effectively supports a batch-8 operation. That accelerator may only support as many embedding tables as can fit into the addressable space of a single memory controller, but can effectively process n independent sparse embedding vectors in parallel, to give batched lookup operation. Such a configuration may be similar to that shown in FIG. 9, but with the data in the first DDR module duplicated to all other DDRs, assuming a full table or multiple tables will fit within a single DRAM chip (module). On current designs, this is likely to be possible for small embedding tables that are less than 250 MB in length. The effectiveness of such an approach may depend on the size of a CPU cache, in some cases.

The accelerator is desirably designed to cope with a very wide range of parameters that describe the sparse embedding vector lookup operation, for example the number and size of the tables and the number of indices in a sparse embedding vector. Given the potential for a large variety of laying out embedding tables across different memory devices, which may be algorithm-dependent, and may have duplicated data regions, a method for locating data within particular memory controller regions and selecting from a range of available choices will be employed.

Where data is duplicated across different memory devices, some dynamic control can be implemented, by monitoring and managing work queue levels of different workloads of DRAM controller requests.

Determining which memory controller to request data from can be done locally to the memory controller (inside FPGA or ASIC) by that entity containing a table describing the range of table and index information it contains. Alternatively, that mapping could be held by a centralised representation of the mapping on the CPU, within the controlling software entity.

There may be some mechanism to handle the asynchronous arrival of memory lookups into the accumulation stages, which may not be co-located with the FPGA where memory lookup is done. There may be multiple accumulator queues in operation so that different input sparse embedding vector lookups can be done on the accelerator simultaneously, keeping the DRAM queues busy by processing independent sparse embedding vector inputs.

Further generalized implementations (in the senses discussed above) may additionally be considered. The processing logic is optionally arranged to control the one or more memory controllers so as to: store a first portion of a first dense embedding vector in a first DRAM module of the plurality of memory channels; store a second portion of the first dense embedding vector in a second DRAM module of the plurality of memory channels; and read the stored first portion of the first vector from the first DRAM module in parallel with the stored second portion of the first vector from the second DRAM module (wherein the DRAM modules are in different memory channels).

In some embodiments, the processing logic may be further arranged to control the one or more memory controllers (for instance, in a different time period than the steps discussed immediately above) so as to: store a first portion of a second dense embedding vector in the first DRAM module of the plurality of DRAM modules; store a second portion of the second dense embedding vector in the second DRAM module of the plurality of DRAM modules; and read the stored first portion of the second dense embedding vector from the first DRAM module in parallel with the stored second portion of the second dense embedding vector from the second DRAM module. This process may allow efficient readout and/or processing of data using separate memory controller modules, especially when the interconnections between memory controller modules may be slow (for instance, using serial interconnections). Advantageously, the processing logic is further arranged to perform a first sum operation on the read first portion of the first dense embedding vector with the read first portion of the second dense embedding vector. The processing logic is beneficially further arranged to perform a second sum operation on the read second portion of the first dense embedding vector with the read second portion of the second dense embedding vector.

In such approaches, a size of the first portion of the first dense embedding vector is beneficially the same as a size of the first portion of the second dense embedding vector. Additionally or alternatively, a size of the second portion of the first dense embedding vector may be the same as a size of the second portion of the second dense embedding vector.

In yet further embodiments, the processing logic is further arranged to control the one or more memory controllers so as to: store first and second dense embedding vectors in a first DRAM module of the plurality of DRAM modules; store the first and second dense embedding vectors in a second DRAM module of the plurality of DRAM modules; and read a first portion of the stored first and second dense embedding vectors from the first DRAM module in parallel with a second portion of the stored first and second dense embedding vectors from the second DRAM module. Optionally, the processing logic is further arranged to perform a first sum operation (or operations) on the read first portion of the first and second dense embedding vectors and to perform a second sum operation (or operations) on the read second portion of the first and second dense embedding vectors. This may represent a (completely) batched system, where the vectors to be summed may all reside within one DRAM module, and the different DRAM modules can be used to provide parallel execution of an independent sparse embedding vector lookup operation.

In embodiments of designs as discussed above, the one or more memory controllers are provided as discrete, interconnected modules (for instance, as discussed above). Then, the processing logic may be arranged to perform the first sum operation (or operations) at the first memory controller (module) and to perform the second sum operation (or operations) at the second memory controller (module). The processing logic may then be arranged to combine a result of the first sum operation (or operations) with a result of the second sum operation (or operations), for example at one of the memory controller modules, at an I/O controller or some other module or component of the accelerator. Further specific details of implementations will again be discussed below.

Figure 12:
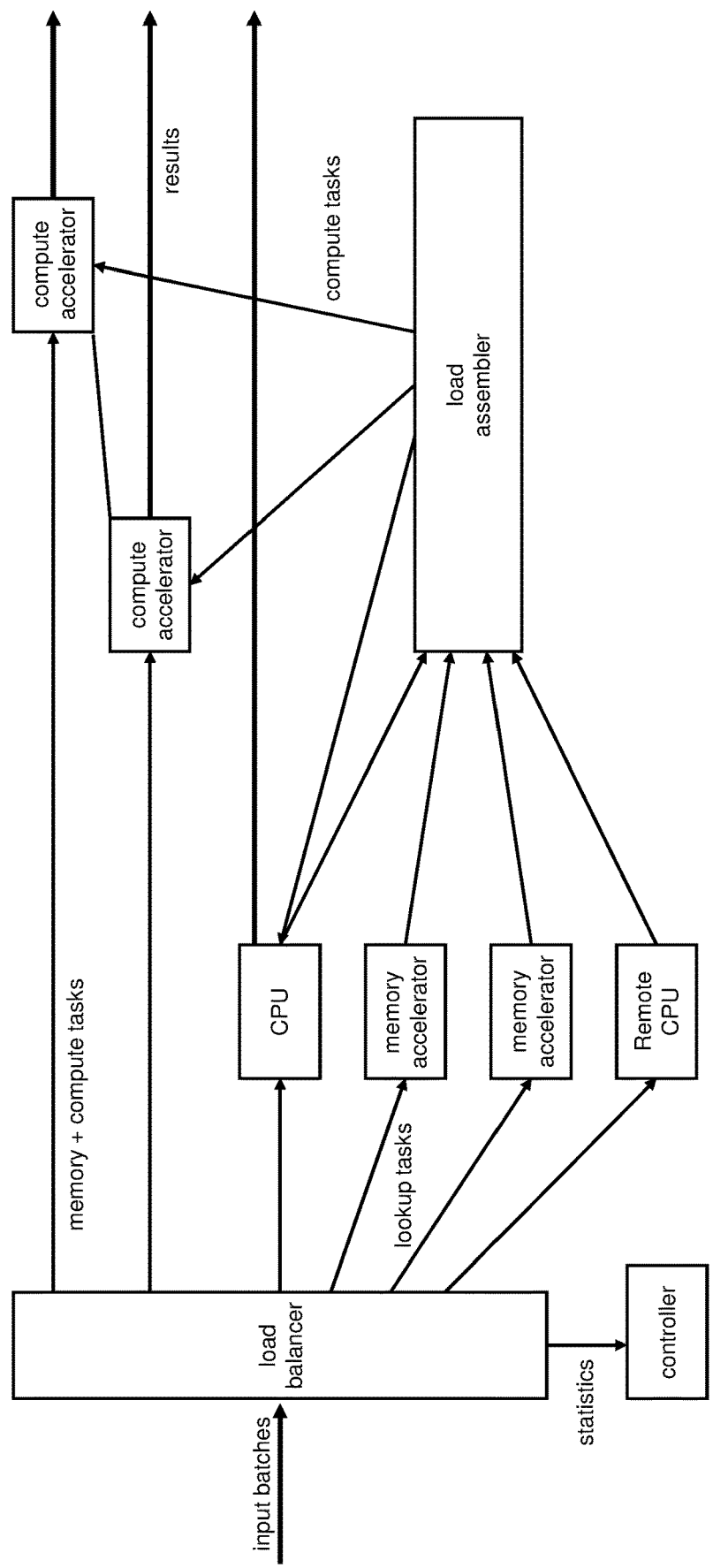
FIG. 12 illustrates a schematic block diagram of a computer system architecture in accordance with an embodiment of the disclosure.

A hardware accelerator as described herein, therefore represents an accelerator specifically designed for improving memory access operations. This contrasts with other types of hardware accelerators, which are designed for computational improvements. Such designs may be combined with control to improve or optimize the performance. Referring to FIG. 12, there is illustrated a schematic block diagram of a computer system architecture in accordance with an embodiment of the disclosure in this respect. A load balancer may be used to split instructions between the main processor (CPU), one or more compute accelerators and one or more memory accelerators. A load assembler may then feedback the outputs from the one or more compute accelerators and/or one or more memory accelerators to the main processor. This generalized architecture may be employed for improvements across a range of computational workloads, particularly ML workloads.

In the approaches described above, a single memory accelerator is discussed. However, multiple memory accelerators can be considered in more generalized systems (whether or not using the architecture of FIG. 12). For some algorithms, a single memory accelerator may not have sufficient memory to store all embedding tables within one accelerator. Then, different embedding tables may be stored in different accelerators, with the CPU or load balancer resolving which memory accelerator to use for different table look ups. Different memory accelerators may be optimized for different applications in some embodiments, for example in terms of the number of memory modules, the number of memory modules controllable by each memory controller or other architectural parameters.

In comparison with existing approaches, implementations according to the present disclosure do not suffer from problem of a worse-than-linear slowdown when multiple models are running ("co-location"). Whereas in existing approaches, where different models may contend for memory resources, co-located models using the implementation of the present disclosure may still contend for bandwidth (throughput), but any slowdown will be linear. Adding more hardware accelerators could thus alleviate the problem.

Splitting the model data and sharing it across multiple accelerators may also have further benefits. Latency will be reduced, since any given request can use all of the accelerators in the system (that is, all of the bandwidth available). Also, a natural load-balancing effect may be seen. If model data is split between accelerators then it may not matter how many requests come in for the different models and in which order: all of the available bandwidth can naturally always be used.

Figure 13:
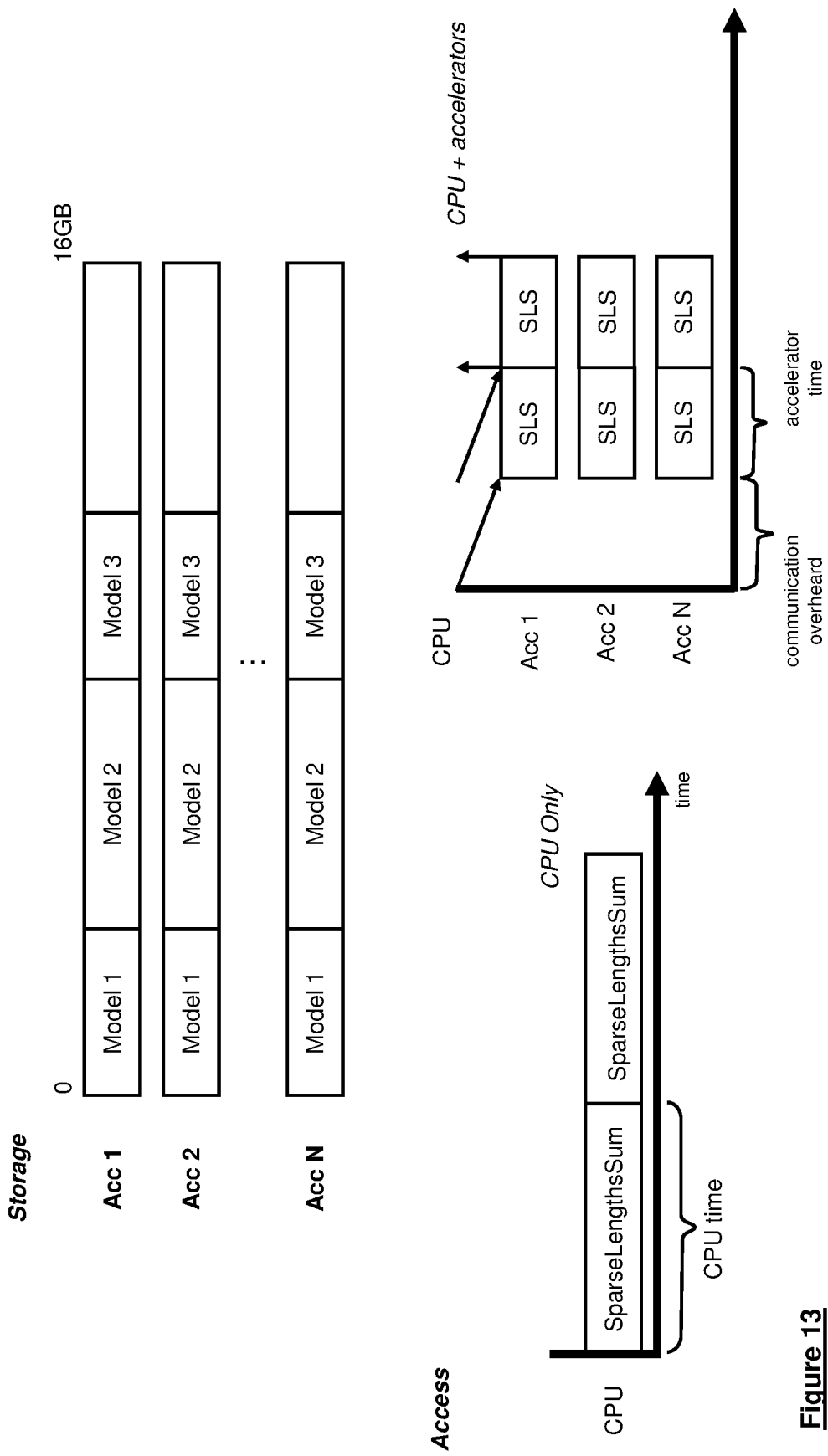
FIG. 13 schematically depicts storage and access across multiple accelerators.

With reference to FIG. 13, there is schematically depicted storage and access across multiple accelerators (striping). The same model (embedding table) may be stored across multiple accelerators. Accelerator bandwidth may be considered as additive, such that adding accelerators may increase throughout and there may be no penalty for co-locating models. The access schematic shows the benefit for striping across multiple accelerators. Any added latency is hidden by striping, such that adding accelerators may reduce latency.

In a generalized sense, there may be considered a computational system, comprising: a main processor; one or more hardware accelerators; and a load balancer, configured to allocate computational instructions for execution between the main processor and the one or more hardware accelerators. The one or more hardware accelerators may comprise one or more memory accelerators (designed for fast random access of memory, such as those described herein) and/or one or more computational accelerators (designed for faster processing of specific types of instructions, such as Graphical Processing Units, GPUs). The load balancer may allocate computational instructions depending on the type of instruction (for example, by analysis of the instruction and determination of type). The main processor and/or the one or more hardware accelerators may then execute the allocated instructions. A result from the one or more hardware accelerators may then be passed back to the main processor via a load assembler. The load assembler may receive results from each of the one or more hardware accelerators and may process the received results (for example, by combining the received results) before passing information based on the received results to the main processor.

In a generalized sense (in line with those discussed above), the dedicated memory of the hardware accelerator advantageously comprises a plurality of individually addressable memory modules (for instance, of DRAM type, as suggested herein). Then, storing the data may comprise determining a distribution of the data across the plurality of individually addressable memory modules for fast random access. For example, this may include a non-contiguous storing of the data across different memory modules and/or overlapping storage of data (in replicated form, for instance) across different memory modules. Preferably, the data is then stored in accordance with the determined distribution.

Although specific embodiments have now been described, the skilled person will understand that various modifications and variations are possible. Firstly, it should be noted that the implementation discussed in this disclosure can be varied considerably. Although an efficient system may comprise a combination of software stack, embedded firmware and electronic subsystem, other combinations of hardware and/or software may be employed. An FPGA implementation is considered in one embodiment, but other types of programmable logic or other logic circuitry, including dedicated IC designs, such as one or more ASICs, may alternatively be implemented. The approach can be implemented in software (such as a computer program) on an existing computer hardware system or a combination of new hardware and software can be used.

The invention claimed is:

1. A hardware accelerator for assisting a separate processor in performing sparse embedding vector lookup operations, each non-zero index of a sparse embedding vector referencing a respective dense embedding vector, the hardware accelerator comprising:
   an Input/Output (I/O) controller, arranged to receive information representing non-zero indices of a sparse embedding vector from the separate processor;
   a plurality of Dynamic Random Access Memory (DRAM) modules, each DRAM module of the plurality of DRAM modules comprising a distinct packaged device or chiplet;
   one or more memory controllers, each memory controller being configured to address a subset of the plurality of DRAM modules, a combination of each memory controller and a subset of the plurality of DRAM modules associated with each memory controller defining a memory channel; and
   processing logic, arranged to control the one or more memory controllers based on the received information received by the I/O controller, so as to perform one or more of: retrieving in parallel more than one dense embedding vector from DRAM modules of the plurality of DRAM modules associated with multiple memory channels; and retrieving a selected dense embedding vector from multiple copies of the selected dense embedding vector stored in the subset of the plurality of DRAM modules defining one of the memory channels of the multiple memory channels.

2. The hardware accelerator of claim 1, wherein each of the plurality of DRAM modules is a Double Data Rate (DDR) Synchronous DRAM (SDRAM) module.

3. The hardware accelerator of claim 1, wherein each memory controller is configured to interface with a subset of the plurality of DRAM modules via a data bus of no more than 40 bits.

4. The hardware accelerator of claim 1, wherein each DRAM module of the plurality of DRAM modules has a respective plurality of memory addresses divided into multiple banks and wherein the processing logic is arranged to control each memory controller so as to read successive dense embedding vectors from different banks.

5. The hardware accelerator of claim 1, wherein each DRAM module of the plurality of DRAM modules has a respective plurality of memory addresses divided into multiple rows, the rows being divided into multiple banks and wherein the processing logic is arranged to control each memory controller so as to activate multiple rows in parallel and to interleave data read operations from each of the activated multiple rows, the multiple rows being in different banks.

6. The hardware accelerator of claim 1,
   wherein the processing logic is further configured to perform a calculation on the data read from the plurality of DRAM modules, based on the processing data, and provide a result of the calculation to the separate processor via the I/O controller.

7. The hardware accelerator of claim 6, wherein:
   the processing data comprises information representing non-zero indices of a sparse embedding vector; and
   the processing logic is configured to read the data from one or more of the plurality of memory channels and perform the calculation based on the received processing data.

8. The hardware accelerator of claim 1, wherein:
   the Input/Output (I/O) controller is further arranged to receive a plurality of dense embedding vectors for storage in the plurality of DRAM modules; and
   the processing logic is further configured to determine memory addresses for storing one or more copies of each received dense embedding vector in at least one of the memory channels.

9. The hardware accelerator of claim 1, wherein the processing logic is configured to determine which one of the multiple copies of the dense embedding vector to be retrieved, based on previous read operations of the memory channel.

10. The hardware accelerator of claim 1, further comprising:
    a plurality of data interfaces, each data interface providing a dedicated data path between a respective memory controller and the respective associated subset of the plurality of DRAM modules defining a respective memory channel; and
    a shared address and command interface for multiple memory channels, between the memory controllers of multiple memory channels and the DRAM modules of the multiple memory channels.

11. The hardware accelerator of claim 1, wherein the one or more memory controllers and at least a portion of the processing logic are provided as single device, for example as an Application Specific Integrated Circuit (ASIC).

12. The hardware accelerator of claim 1, wherein the one or more memory controllers are each provided as a discrete, memory controller module and the processing logic is distributed between the one or more memory controller modules.

13. A method for performing sparse embedding vector lookup operations, each non-zero index of a sparse embedding vector referencing a respective dense embedding vector, comprising:
    communicating first data for sparse embedding vector lookup operations to one or more hardware accelerators that are separate from a main processor, the main processor having associated memory for data storage and each of the one or more hardware accelerators comprising both processing logic and a dedicated memory that is separate from the associated memory of the main processor, the dedicated memory of each of the one or more hardware accelerators being divided into one or more memory channels, each memory channel being defined by a distinct, commonly controlled portion of the dedicated memory associated with one or more of the hardware accelerators;
    storing the first data for the sparse embedding vector lookup operations on the dedicated memory of each of the one or more hardware accelerators; and
    performing the sparse vector embedding lookup operations at the one or more hardware accelerators by reading at least some of the first data for the sparse embedding vector lookup operation stored on a respective dedicated memory of one or more of the hardware accelerators; and
    wherein more than one dense embedding vector for one or more sparse embedding vector lookup operations is read in parallel from more than one memory channel of the dedicated memory of one or more of each of the hardware accelerators; or multiple copies of a dense embedding vector are stored in the distinct, commonly controlled portion of the dedicated memory associated with one or more of the hardware accelerators defining one of the one or more memory channels.

14. The method of claim 13, further comprising:
   identifying the sparse embedding vector lookup operation within instructions to be processed by a main processor; and/or
   communicating a result or partial result of the sparse embedding vector lookup operation from the one or more hardware accelerators to the main processor.

15. The method of claim 13, wherein each dedicated memory comprises a respective plurality of individually addressable memory modules divided between the memory channels and wherein the step of storing the data comprises:
   determining a distribution of the data across the one or more memory channels of the respective dedicated memory for fast random access; and
   storing the data in accordance with the determined distribution.

16. The method of claim 15, wherein the data for sparse embedding vector lookup operations comprises a plurality of dense embedding vectors, a distribution of the data across the one or more memory channels comprising storing multiple copies of each dense embedding vector of the plurality of dense embedding vectors in one of the one or more memory channels.

17. A method for performing sparse embedding vector lookup operations, each non-zero index of a sparse embedding vector referencing a respective dense embedding vector, comprising:
   receiving information representing non-zero indices of a sparse embedding vector;
   controlling one or more memory controllers to read one or more dense embedding vectors from a plurality of Dynamic Random Access Memory (DRAM) modules based on the received information representing non-zero indices of the sparse embedding vector, each DRAM module of the plurality of DRAM modules comprising a distinct packaged device or chiplet and each memory controller addressing a subset of the plurality of DRAM modules, a combination of each memory controller and a subset of the plurality of DRAT modules associated with the each memory controller defining a memory channel;
   wherein more than one dense embedding vector is read in parallel from DRAM modules of the plurality of DRAM modules associated with multiple memory channels or wherein multiple copies of the respective dense embedding vector are stored in the subset of the plurality of DRAM modules defining one of the memory channels.

18. The method of claim 17, further comprising performing sparse embedding vector lookup operations, each non-zero index of a sparse embedding vector referencing a respective dense embedding vector by:
   communicating first data for sparse embedding vector lookup operations to one or more hardware accelerators that are separate from a main processor, the main processor having associated memory for data storage and each of the one or more hardware accelerators comprising both processing logic and a dedicated memory that is separate from the associated memory of the main processor, the dedicated memory of each of the one or more hardware accelerators being divided into one or more memory channels, each memory channel being defined by a distinct, commonly controlled portion of the dedicated memory associated with one or more of the hardware accelerators;
   storing the first data for the sparse embedding vector lookup operations on the dedicated memory of each of the one or more hardware accelerators; and
   performing the sparse vector embedding lookup operations at the one or more hardware accelerators by reading at least some of the first data for the sparse embedding vector lookup operation stored on a respective dedicated memory of one or more of the hardware accelerators; and
   wherein more than one dense embedding vector for one or more sparse embedding vector lookup operations is read from more than one memory channel of the dedicated memory of one or more of the hardware accelerators in parallel; or multiple copies of a dense embedding vector are stored in the distinct, commonly controlled portion of the dedicated memory associated with one or more of the hardware accelerators defining one of the one or more memory channels.

19. The method of claim 13, wherein the method is performed using a hardware accelerator for assisting a separate processor in performing sparse embedding vector lookup operations, each non-zero index of a sparse embedding vector referencing a respective dense embedding vector, the hardware accelerator comprising:
   an Input/Output (I/O) controller, arranged to receive information representing non-zero indices of a sparse embedding vector from the separate processor;
   a plurality of Dynamic Random Access Memory (DRAM) modules, each DRAM module of the plurality of DRAM modules comprising a distinct packaged device or chiplet;
   one or more memory controllers, each memory controller being configured to address a subset of the plurality of DRAM modules, a combination of each memory controller and a subset of the plurality of DRAM modules associated with each memory controller defining a memory channel; and
   processing logic, arranged to control the one or more memory controllers based on the received information, so as to perform one or more of: retrieving more than one dense embedding vector from DRAM modules of the plurality of DRAM modules associated with multiple memory channels in parallel; and retrieving a selected dense embedding vector from multiple copies of the selected dense embedding vector stored in the subset of the plurality of DRAM modules defining one of the memory channels.

20. The method of claim 17, wherein the method is performed using a hardware accelerator for assisting a separate processor in performing sparse embedding vector lookup operations, each non-zero index of a sparse embedding vector referencing a respective dense embedding vector, the hardware accelerator comprising:
   an Input/Output (I/O) controller, arranged to receive information representing non-zero indices of a sparse embedding vector from the separate processor;
   a plurality of Dynamic Random Access Memory (DRAM) modules, each DRAM module of the plurality of DRAM modules comprising a distinct packaged device or chiplet;
   one or more memory controllers, each memory controller being configured to address a subset of the plurality of DRAM modules, a combination of each memory controller and a subset of the plurality of DRAM modules associated with each memory controller defining a memory channel; and processing logic, arranged to control the one or more memory controllers based on the received information, so as to perform one or more of: retrieving more than one dense embedding vector from DRAM modules of the plurality of DRAM modules associated with multiple memory channels in parallel; and retrieving a selected dense embedding vector from multiple copies of the selected dense embedding vector stored in the subset of the plurality of DRAM modules defining one of the memory channels.

* * * * *

UNITED STATES PATENT AND TRADEMARK OFFICE
CERTIFICATE OF CORRECTION

| | | |
|---|---|---|
| PATENT NO. | : 11,816,025 B2 | Page 1 of 1 |
| APPLICATION NO. | : 17/765973 | |
| DATED | : November 14, 2023 | |
| INVENTOR(S) | : Hazel et al. | |

It is certified that error appears in the above-identified patent and that said Letters Patent is hereby corrected as shown below:

In the Claims

Column 27, Line 42, Claim 17: Please correct "DRAT" to read -- DRAM --

Signed and Sealed this
Twenty-seventh Day of August, 2024

Katherine Kelly Vidal
*Director of the United States Patent and Trademark Office*